United States Patent
Islam et al.

(10) Patent No.: US 11,206,634 B2
(45) Date of Patent: Dec. 21, 2021

(54) PAGING CONFIGURATION IN BEAMFORMED WIRELESS COMMUNICATIONS

(71) Applicant: QUALCOMM Incorporated, San Diego, CA (US)

(72) Inventors: Muhammad Nazmul Islam, Littleton, MA (US); Tao Luo, San Diego, CA (US); Ozcan Ozturk, San Diego, CA (US); Heechoon Lee, San Diego, CA (US); Prashanth Hande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/446,438

(22) Filed: Jun. 19, 2019

(65) Prior Publication Data

US 2019/0394749 A1 Dec. 26, 2019

Related U.S. Application Data

(60) Provisional application No. 62/738,815, filed on Sep. 28, 2018, provisional application No. 62/688,375, filed on Jun. 21, 2018.

(51) Int. Cl.
*H04W 68/00* (2009.01)
*H04W 76/27* (2018.01)
(Continued)

(52) U.S. Cl.
CPC ......... *H04W 68/005* (2013.01); *H04L 5/0094* (2013.01); *H04W 24/08* (2013.01);
(Continued)

(58) Field of Classification Search
None
See application file for complete search history.

(56) References Cited

U.S. PATENT DOCUMENTS

2017/0325193 A1* 11/2017 Xiong ............... H04W 52/0245
2017/0367069 A1* 12/2017 Agiwal ............... H04W 68/005
(Continued)

FOREIGN PATENT DOCUMENTS

WO   WO-2018085725 A1   5/2018

OTHER PUBLICATIONS

International Search Report and Written Opinion—PCT/US2019/038288—ISA/EPO—dated Nov. 7, 2019.
(Continued)

*Primary Examiner* — Anh Ngoc M Nguyen
(74) *Attorney, Agent, or Firm* — Holland & Hart LLP

(57) ABSTRACT

Methods, systems, and devices for wireless communications are described in which a paging configuration may be provided by a base station that indicates one or more occasions during which a user equipment (UE) is to monitor for pages. A location of the paging occasion may be based at least in part on at least one synchronization signal block (SSB) transmitted by the base station. A mapping between a paging occasion index and the location of the paging occasion is indicated in the paging configuration. Paging windows may be configured during downlink slots that contain an SSB transmission. Paging transmissions may use beamforming parameters that are the same as SSB transmission beamforming parameters.

31 Claims, 20 Drawing Sheets

(51) Int. Cl.
| | |
|---|---|
| H04L 5/00 | (2006.01) |
| H04W 24/08 | (2009.01) |
| H04W 56/00 | (2009.01) |
| H04W 72/04 | (2009.01) |
| H04W 74/08 | (2009.01) |
| H04W 80/02 | (2009.01) |

(52) U.S. Cl.
CPC ....... *H04W 56/001* (2013.01); *H04W 72/042* (2013.01); *H04W 72/0446* (2013.01); *H04W 74/0833* (2013.01); *H04W 76/27* (2018.02); *H04W 80/02* (2013.01)

(56) References Cited

U.S. PATENT DOCUMENTS

| | | | | |
|---|---|---|---|---|
| 2018/0026698 | A1* | 1/2018 | Lee | H04B 7/2125 370/335 |
| 2018/0077682 | A1* | 3/2018 | Li | H04W 52/0222 |
| 2019/0069271 | A1* | 2/2019 | Reial | H04W 72/005 |
| 2020/0120634 | A1* | 4/2020 | Lee | H04W 74/0833 |
| 2020/0205124 | A1* | 6/2020 | Liu | H04W 52/0216 |

OTHER PUBLICATIONS

Mediatek Inc: "Paging Frame and Paging Occasion Calculation in NR," 3GPP Draft; R2-1807743 Paging Frame and Paging Occasion Calculation in NR, 3rd Generation Partnership Project (3GPP), Mobile Competence Centre; 650, Route Des Lucioles; F-06921 Sophia-Antipolis Cedex, vol. RAN WG2, No. Busan, Korea; May 21, 2018-May 25, 2018, May 20, 2018, XP051444086, 6 pages, Retrieved from the Internet: URL: http://www.3gpp.org/ftp/Meetings%5F3GPP%5FSYNC/RAN2/Docs/ [retrieved on May 20, 2018] paragraph [0001] paragraph [2.1.2] paragraphs [2.2.1]-[2.2.2] figure 2.
Panasonic: "Collision between SSB and PDCCH," 3GPP Draft; R1-1806915, 3rd Generation Partnership Project (3GPP), Mobile Competence Centre; 650, Route Des Lucioles; F-06921 Sophia-Antipolis Cedex; France, No. Busan, Korea; May 21, 2018-May 25, 2018, May 20, 2018, XP051442115, 3 Pages, Retrieved from the Internet: URL: http://www.3gpp.org/ftp/Meetings%5F3GPP%5FSYNC/RAN1/Docs/ [retrieved on May 20, 2018] paragraph [0002].
Huawei et al., "NR Paging Options", 3GPP Draft; R2-1808440, NR Paging Options, 3rd Generation Partnership Project (3GPP), Mobile Competence Centre, 650, Route Des Lucioles, F-06921 Sophia-Antipolis Cedex, France, vol. RAN WG2, No. Busan, Korea; May 21, 2018-May 25, 2018 May 20, 2018, XP051444714, Retrieved from the Internet: URL:http://www.3gpp.org/ftp/Meetings%5F3GPP%5FSYNC/RAN2/Docs/ [retrieved on May 20, 2018], p. 1, lines 1-12, paragraph 1, p. 2, lines 11-16, paragraph 2, p. 3, lines 1-19, 25, paragraph 2.1, figure 1, 11 pages.
Partial International Search Report—PCT/US2019/038288—ISA/EPO—dated Sep. 9, 2019.
Qualcomm Incorporated: "Paging Design Consideration", 3GPP Draft; R1-1800849, 3rd Generation Partnership Project (3GPP), Mobile Competence Centre, 650, Route Des Lucioles, F-06921 Sophia-Antipolis Cedex, France, vol. RAN WG1, No. Vancouver, Canada; Jan. 22, 2018-Jan. 26, 2018 Jan. 13, 2018, XP051385121, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018], 11 pages.

* cited by examiner

405 Connected Mode UE

410 Idle Mode UE

| Paging DCI Location Index | Corresponding SSB Index |
|---|---|
| 1 | 1 |
| 2 | 5 |
| 3 | 6 |
| 4 | 13 |
| 5 | 6 |

510 — Indicated Via SIB1
515 — Indicated Via RRC
505 — Ordered Search Space
500

FIG. 5

PAGING CONFIGURATION IN BEAMFORMED WIRELESS COMMUNICATIONS

CROSS REFERENCE

The present Application for Patent claims the benefit of U.S. Provisional Patent Application No. 62/688,375 by ISLAM, et al., entitled "PAGING CONFIGURATION IN BEAMFORMED WIRELESS COMMUNICATIONS," filed Jun. 21, 2018, and claims the benefit of U.S. Provisional Patent Application No. 62/738,815 by ISLAM, et al., entitled "PAGING CONFIGURATION IN BEAMFORMED WIRELESS COMMUNICATIONS" filed Sep. 28, 2018, assigned to the assignee hereof, and expressly incorporated herein.

BACKGROUND

The following relates generally to wireless communications, and more specifically to paging configuration in beamformed wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiplexing (OFDM), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some deployments, wireless communications systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. When a UE is monitoring for transmissions from a base station, multiple beamformed transmission beams may be monitored for information. Such monitoring may have associated energy consumption and overhead at a UE, and thus techniques that may reduce an amount of time a UE monitors for downlink transmission beams may be desirable.

SUMMARY

The described techniques relate to improved methods, systems, devices, and apparatuses that support paging configuration in beamformed wireless communications. According to various aspects of the present disclosure, a paging configuration may be provided by a base station that indicates one or more occasions during which a user equipment (UE) is to monitor for pages. A location of the paging occasion may be based at least in part on at least one synchronization signal block (SSB) transmitted by the base station. In some cases, a mapping between a paging occasion index and the location of the paging occasion is indicated in the paging configuration. In some cases, paging windows may be configured during downlink slots that contain an SSB transmission and paging transmissions may use beamforming parameters that are the same as SSB transmission beamforming parameters.

In some cases, a base station may identify multiple orders of paging occasions, based at least in part on a type of transmission that is used to indicate SSB locations to a UE. In some cases, paging search spaces for paging downlink control information (DCI) transmissions may be based on a combined ordering of paging occasions. In some cases, the combined ordering of paging search spaces may be based on a first order of paging occasions followed by one or more paging occasions of a second order of paging occasions that are not included in the first order of paging occasions.

A method of wireless communication at a UE is described. The method may include receiving a paging configuration from a base station, the paging configuration indicating a paging occasion during which the UE is to monitor for pages that are transmitted from the base station, where a location of the paging occasion is based at least in part on at least one synchronization signal block (SSB) transmitted by the base station, and where a mapping between a paging occasion index and the location of the paging occasion is indicated in the paging configuration, monitoring for a paging transmission from the base station during the paging occasion, and receiving a page from the base station based on the monitoring.

An apparatus for wireless communication at a UE is described. The apparatus may include a processor, memory in electronic communication with the processor, and instructions stored in the memory. The instructions may be executable by the processor to cause the apparatus to receive a paging configuration from a base station, the paging configuration indicating a paging occasion during which the UE is to monitor for pages that are transmitted from the base station, where a location of the paging occasion is based at least in part on at least one synchronization signal block (SSB) transmitted by the base station, and where a mapping between a paging occasion index and the location of the paging occasion is indicated in the paging configuration, monitor for a paging transmission from the base station during the paging occasion, and receive a page from the base station based on the monitoring.

Another apparatus for wireless communication at a UE is described. The apparatus may include means for receiving a paging configuration from a base station, the paging configuration indicating a paging occasion during which the UE is to monitor for pages that are transmitted from the base station, where a location of the paging occasion is based at least in part on at least one synchronization signal block (SSB) transmitted by the base station, and where a mapping between a paging occasion index and the location of the paging occasion is indicated in the paging configuration, monitoring for a paging transmission from the base station during the paging occasion, and receiving a page from the base station based on the monitoring.

A non-transitory computer-readable medium storing code for wireless communication at a UE is described. The code may include instructions executable by a processor to receive a paging configuration from a base station, the paging configuration indicating a paging occasion during which the UE is to monitor for pages that are transmitted from the base station, where a location of the paging occasion is based at least in part on at least one synchronization signal block (SSB) transmitted by the base station, and where a mapping between a paging occasion index and the location of the paging occasion is indicated in the paging configuration, monitor for a paging transmission from the base station during the paging occasion, and receive a page from the base station based on the monitoring.

In some examples of the method, apparatuses, and non-transitory computer-readable medium described herein, the paging configuration further indicates a starting location of the paging occasion of the base station within a paging frame. In some examples of the method, apparatuses, and non-transitory computer-readable medium described herein, the paging occasion comprises a physical downlink control channel (PDCCH) monitoring occasion.

In some examples, the mapping may provide a one-to-one mapping between SSBs and paging monitoring occasions. In other examples, the mapping may provide a many-to-one mapping between SSBs and paging monitoring occasions. In some cases, two or more paging monitoring occasions are configured within one slot, where different SSBs are mapped to each of the two or more paging monitoring occasions within the one slot.

In some examples of the method, apparatuses, and non-transitory computer-readable medium described herein, a demodulation reference signal (DMRS) of the paging transmission may be spatially quasi-co-located (QCL) with the SSB that may be associated with a page monitoring window of the paging transmission. In some examples of the method, apparatuses, and non-transitory computer-readable medium described herein, a paging search space may be unavailable based at least in part on the paging search space overlapping with uplink resources or valid physical random access channel (PRACH) occasions.

In some examples of the method, apparatuses, and non-transitory computer-readable medium described herein, the paging configuration may be received from the base station via one or more of a DCI transmission, a medium access control (MAC) control element (CE) transmission, a handover message, a reference signal sequence, or any combinations thereof.

In some examples of the method, apparatuses, and non-transitory computer-readable medium described herein, the paging occasion may be associated with a page monitoring window, and a duration of the page monitoring window may be based on a beam sweep duration of the paging occasion. In some examples of the method, apparatuses, and non-transitory computer-readable medium described herein, a starting location of the page monitoring window may be based on an offset value associated with the paging occasion. In some examples of the method, apparatuses, and non-transitory computer-readable medium described herein, the starting location of the page monitoring window may be based on an index value of the at least one SSB received from the base station. In some examples of the method, apparatuses, and non-transitory computer-readable medium described herein, the paging configuration indicates a number of downlink slots of the page monitoring window.

Some examples of the method, apparatuses, and non-transitory computer-readable medium described herein may further include operations, features, means, or instructions for determining the duration of the page monitoring window based on the number of downlink slots and one or more slots that may be unavailable for paging transmissions between a starting slot associated with the starting location and the last slot of the number of downlink slots.

In some examples of the method, apparatuses, and non-transitory computer-readable medium described herein, the paging configuration may be received from the base station via one or more of a remaining minimum system information (RMSI) transmission, an other system information (OSI) transmission, a radio resource configuration (RRC) transmission, or any combinations thereof.

In some examples of the method, apparatuses, and non-transitory computer-readable medium described herein, the paging occasion may be associated with a page monitoring window, and a duration of the page monitoring window may be based at least in part on a subcarrier spacing (SCS) configured for the beamformed transmission beams. In some examples of the method, apparatuses, and non-transitory computer-readable medium described herein, the page may be received from the base station via a beamformed transmission beam.

A method of wireless communication at a base station is described. The method may include transmitting a paging configuration to a UE, the paging configuration indicating one or more paging occasions during which the UE is to monitor for pages that are transmitted from the base station, where a location of the paging occasion is based at least in part on at least one synchronization signal block (SSB) transmitted by the base station, and where a mapping between a paging occasion index and the location of the paging occasion is indicated in the paging configuration, transmitting a page to the UE during at least one of the paging occasions, and receiving paging response from the UE responsive to the page.

An apparatus for wireless communication at a base station is described. The apparatus may include a processor, memory in electronic communication with the processor, and instructions stored in the memory. The instructions may be executable by the processor to cause the apparatus to transmit a paging configuration to a UE, the paging configuration indicating one or more paging occasions during which the UE is to monitor for pages that are transmitted from the base station, where a location of the paging occasion is based at least in part on at least one synchronization signal block (SSB) transmitted by the base station, and where a mapping between a paging occasion index and the location of the paging occasion is indicated in the paging configuration, transmit a page to the UE during at least one of the paging occasions, and receive paging response from the UE responsive to the page.

Another apparatus for wireless communication at a base station is described. The apparatus may include means for transmitting a paging configuration to a UE, the paging configuration indicating one or more paging occasions during which the UE is to monitor for pages that are transmitted from the base station, where a location of the paging occasion is based at least in part on at least one synchronization signal block (SSB) transmitted by the base station, and where a mapping between a paging occasion index and the location of the paging occasion is indicated in the paging configuration, transmitting a page to the UE during at least one of the paging occasions, and receiving paging response from the UE responsive to the page.

A non-transitory computer-readable medium storing code for wireless communication at a base station is described. The code may include instructions executable by a processor to transmit a paging configuration to a UE, the paging configuration indicating one or more paging occasions during which the UE is to monitor for pages that are transmitted from the base station, where a location of the paging occasion is based at least in part on at least one synchronization signal block (SSB) transmitted by the base station, and where a mapping between a paging occasion index and the location of the paging occasion is indicated in the paging configuration, transmit a page to the UE during at least one of the paging occasions, and receive paging response from the UE responsive to the page.

In some examples of the method, apparatuses, and non-transitory computer-readable medium described herein, the paging configuration further indicates a starting location of the paging occasion of the base station within a paging frame. In some examples of the method, apparatuses, and non-transitory computer-readable medium described herein, the paging occasion may be a physical downlink control channel (PDCCH) monitoring occasion.

In some examples, the mapping may provide a one-to-one mapping between SSBs and paging monitoring occasions. In some examples, the mapping may provide a many-to-one mapping between SSBs and paging monitoring occasions. In some cases, two or more paging monitoring occasions are configured within one slot, where different SSBs are mapped to each of the two or more paging monitoring occasions within the one slot.

In some examples of the method, apparatuses, and non-transitory computer-readable medium described herein, the paging configuration may be transmitted via one or more of a DCI transmission, a medium access control (MAC) control element (CE) transmission, a handover message, a reference signal sequence, or any combinations thereof.

In some examples of the method, apparatuses, and non-transitory computer-readable medium described herein, the paging occasion may be associated with a page monitoring window, and a duration of the page monitoring window may be based on a beam sweep duration of the paging occasion. In some examples of the method, apparatuses, and non-transitory computer-readable medium described herein, a starting location of the page monitoring window may be based on an offset value associated with the paging occasion. In some examples of the method, apparatuses, and non-transitory computer-readable medium described herein, the starting location of the page monitoring window may be based on an index value of the at least one SSB transmitted by the base station. In some examples of the method, apparatuses, and non-transitory computer-readable medium described herein, the paging configuration indicates a number of downlink slots of the page monitoring window.

Some examples of the method, apparatuses, and non-transitory computer-readable medium described herein may further include operations, features, means, or instructions for determining the duration of the page monitoring window based on the number of downlink slots and one or more slots that may be unavailable for paging transmissions between a starting slot associated with the starting location and the last slot of the number of downlink slots.

In some examples of the method, apparatuses, and non-transitory computer-readable medium described herein, the paging configuration may be transmitted via one or more of a remaining minimum system information (RMSI) transmission, an other system information (OSI) transmission, a radio resource configuration (RRC) transmission, or any combinations thereof.

In some examples of the method, apparatuses, and non-transitory computer-readable medium described herein, the paging occasion is associated with a page monitoring window, and a duration of the page monitoring window may be based on a subcarrier spacing (SCS) configured for the beamformed transmission beams.

A method of wireless communication at a base station is described. The method may include identifying a first set of paging occasions corresponding to a first set of synchronization signal blocks (SSBs) and a second set of paging occasions corresponding to a second set of SSBs for transmitting paging DCI, where the first set of paging occasions and the second set of paging occasions are different, ordering transmissions of the paging DCI according to the first set of paging occasions and second set of paging occasions, and transmitting the paging DCI based on the ordering.

An apparatus for wireless communication at a base station is described. The apparatus may include a processor, memory in electronic communication with the processor, and instructions stored in the memory. The instructions may be executable by the processor to cause the apparatus to identify a first set of paging occasions corresponding to a first set of synchronization signal blocks (SSBs) and a second set of paging occasions corresponding to a second set of SSBs for transmitting paging DCI, where the first set of paging occasions and the second set of paging occasions are different, order transmissions of the paging DCI according to the first set of paging occasions and second set of paging occasions, and transmit the paging DCI based on the ordering.

Another apparatus for wireless communication at a base station is described. The apparatus may include means for identifying a first set of paging occasions corresponding to a first set of synchronization signal blocks (SSBs) and a second set of paging occasions corresponding to a second set of SSBs for transmitting paging DCI, where the first set of paging occasions and the second set of paging occasions are different, ordering transmissions of the paging DCI according to the first set of paging occasions and second set of paging occasions, and transmitting the paging DCI based on the ordering.

A non-transitory computer-readable medium storing code for wireless communication at a base station is described. The code may include instructions executable by a processor to identify a first set of paging occasions corresponding to a first set of synchronization signal blocks (SSBs) and a second set of paging occasions corresponding to a second set of SSBs for transmitting paging DCI, where the first set of paging occasions and the second set of paging occasions are different, order transmissions of the paging DCI according to the first set of paging occasions and second set of paging occasions, and transmit the paging DCI based on the ordering.

In some examples of the method, apparatuses, and non-transitory computer-readable medium described herein, the first set of paging occasions correspond to actually transmitted SSBs indicated in a SIB transmission, and the second set of paging occasions correspond to actually transmitted SSBs indicated in RRC signaling. In some examples of the method, apparatuses, and non-transitory computer-readable medium described herein, the first set of paging occasions correspond to actually transmitted SSBs indicated in resource control (RRC) signaling, and the second set of paging occasions correspond to actually transmitted SSBs indicated in a SIB transmission.

In some examples of the method, apparatuses, and non-transitory computer-readable medium described herein, the first set of paging occasions may be identified by a first bitmap provided in a SIB that may be transmitted by the base station. In some examples of the method, apparatuses, and non-transitory computer-readable medium described herein, the second set of paging occasions may be identified by a second bitmap provided in RRC signaling. In some examples of the method, apparatuses, and non-transitory computer-readable medium described herein, the second bitmap may be capable of indicating each potential actually transmitted SSBs, and the first bitmap may be capable of indicating certain subsets of potential actually transmitted SSBs.

BRIEF DESCRIPTION OF THE DRAWINGS

FIG. 5 illustrates an example of a combined search space ordering based on SSB index and DCI location that supports paging configuration in beamformed wireless communications in accordance with aspects of the present disclosure.

DETAILED DESCRIPTION

Figure 1:
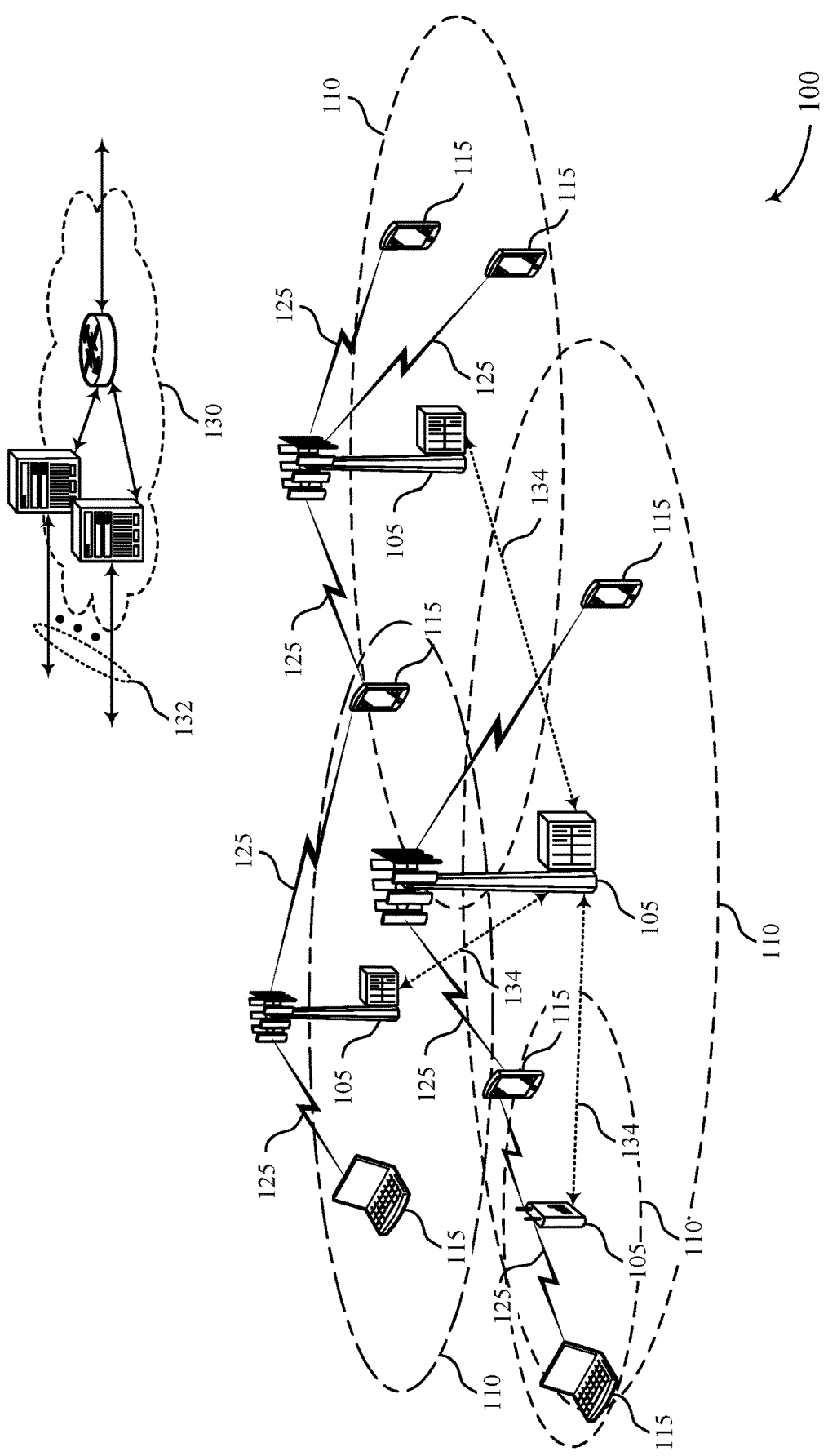
FIG. 1 illustrates an example of a system for wireless communications that supports paging configuration in beamformed wireless communications in accordance with aspects of the present disclosure.

The described techniques relate to improved methods, systems, devices, and apparatuses that support paging configuration in beamformed wireless communications. In some deployments, an idle mode user equipment (UE) may monitor for paging transmissions from a base station. Further, in some cases synchronization signal blocks (SSBs) may be transmitted using beamformed transmission beams, which may be monitored by the UE. Paging transmissions may be transmitted using beamforming parameters that are used for transmitting the SSBs. In some aspects of the present disclosure, a paging configuration may be provided by a base station that indicates one or more occasions during which the UE is to monitor for pages, where locations of monitored paging occasions may be based at least in part on which beamformed transmission beams are used to transmit SSBs by the base station. In some cases, a mapping between a paging occasion index and the location of the paging occasion is indicated in the paging configuration. In some cases, paging windows may be configured during downlink slots that contain SSB transmissions.

In some cases, an explicitly configured location of a first paging physical downlink control channel (PDCCH) monitoring occasion of the paging occasion may be signaled to UEs, along with different parameters of the configured paging search space (e.g., monitoringSlotPeriodicityAndOffset, duration and monitoringSymbolsWithinSlot) to define a non-default association between SSBs and paging PDCCH monitoring occasions. Further, in some cases, a one-to-one mapping may be provided between SSBs and paging PDCCH monitoring occasions. SSBs may thus be consecutively mapped to different paging PDCCH monitoring occasions. If there are multiple paging PDCCH monitoring occasions within a transmission slot, different SSBs may be mapped to different paging PDCCH monitoring occasions within the slot.

In some cases, a base station may identify multiple orders of paging occasions, based at least in part on a type of transmission that is used to indicate SSB locations to a UE. In some cases, paging search spaces for paging downlink control information (DCI) transmissions may be based on a combined ordering of paging occasions. In some cases, the combined ordering of paging search spaces may be based on a first order of paging occasions followed by one or more paging occasions of a second order of paging occasions that are not included in the first order of paging occasions. In some cases, UEs as discussed herein may serve the functionality of a UE in an integrated access backhaul (IAB) network. Systems employing techniques such as provided herein may have enhanced efficiency due to lower overhead and power consumption achieved by transmission of paging transmissions and monitoring for paging transmissions only in configured paging occasions.

Aspects of the disclosure are initially described in the context of a wireless communications system. Aspects of the disclosure are further illustrated by and described with reference to apparatus diagrams, system diagrams, and flowcharts that relate to paging configuration in beamformed wireless communications.

FIG. 1 illustrates an example of a wireless communications system 100 that supports paging configuration in beamformed wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a predefined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

According to some examples, a paging configuration may be provided by a base station 105 that indicates one or more occasions during which a UE 115 is to monitor for pages. A location of the paging occasion(s) may be based at least in part on actual locations of SSBs transmitted by the base station 105. In some cases, a mapping between a paging occasion index and the location of the paging occasion is indicated in the paging configuration. In some cases, paging windows may be configured during downlink slots that contain an SSB transmission and paging transmissions may use beamforming parameters that are the same as SSB transmission beamforming parameters. In some cases, a base station 105 may identify multiple orders of paging occasions, based at least in part on a type of transmission that is used to indicate SSB locations to a UE 115. In some cases, paging search spaces for paging DCI transmissions may be based on a combined ordering of paging occasions. In some cases, the combined ordering of paging search spaces may be based on a first order of paging occasions (e.g., an order determined based on a system information block type one (SIB1) transmission) followed by one or more paging occasions of a second order of paging occasions (e.g., an order determined based on a RRC transmission) that are not included in the first order of paging occasions.

Figure 2:
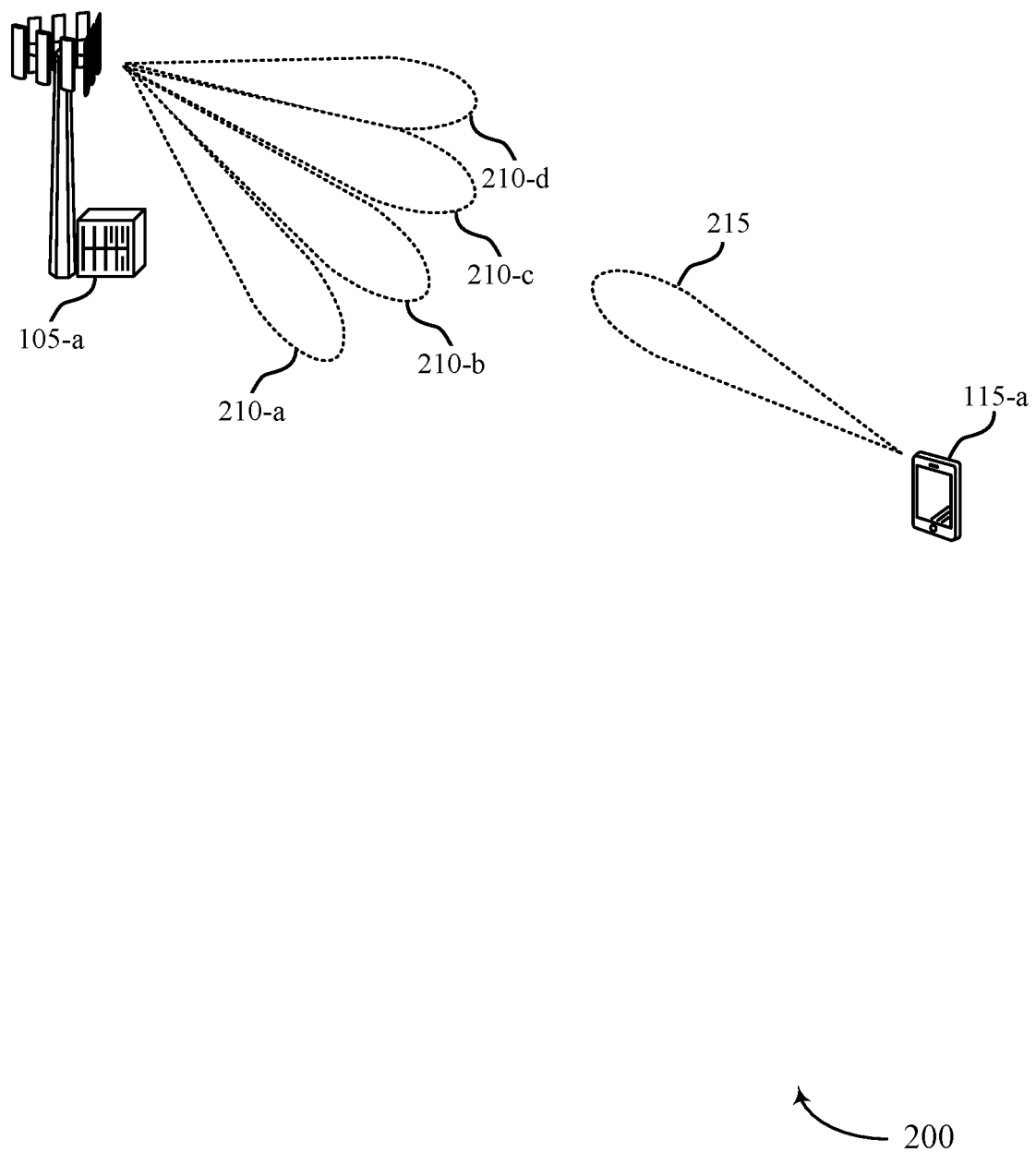
FIG. 2 illustrates an example of a portion of a wireless communications system that supports paging configuration in beamformed wireless communications in accordance with aspects of the present disclosure.

FIG. 2 illustrates an example of a wireless communications system 200 that supports paging configuration in beamformed wireless communications in accordance with aspects of the present disclosure. In some examples, wireless communications system 200 may implement aspects of wireless communications system 100. Wireless communications system 200 may include a base station 105-a and a UE 115-a, which may be examples of the corresponding devices described herein.

In this example, base station 105-a may transmit a plurality of SSBs to UEs located with the coverage area of base station 105-a, including UE 115-a. The SSBs may be transmitted using beams 210. Further, each beam 210 may have an associated paging occasion during which a paging transmission may be quasi-co-located (QCL) with the corresponding SSB. The UE 115-a may use a related beam 215 for uplink transmissions, and beamforming parameters for related beam 215 may be used for both uplink transmissions and downlink transmissions. While the illustration in FIG. 2 shows beamformed transmissions between base station 105-a and UE 115-a, techniques provided herein may be applied to other types of transmissions as well.

In some cases, subframe or downlink slot locations of paging occasions are configurable by the base station 105-a.

In some cases, SSBs may be transmitted in up to 64 SSB directions, but the base station 105-*a* may actually transmit SSB in a subset of these 64 available SSB directions. In such cases, paging transmissions may also be transmitted only in the subset of directions (e.g., in directions of transmission beams 210-*a*, 210-*b*, 210-*c*, and 210-d). Configurable subframe or downlink slot locations of paging locations may thus allow the base station 105-*a* to configure a gap between two paging occasions that can accommodate a paging sweep performed by the base station 105-*a* and actually transmitted SSBs. In some cases, the base station 105-*a* may configure a starting location of each paging occasion within a paging frame, and provide such a configuration to the UE 115-*a* via, for example, a system information block (SIB). The UE 115-*a* may then, for each paging occasion, monitor for pages in accordance with the starting location of the paging occasion.

In other cases, the base station 105-*a* may configure a starting location of a first paging occasion within a paging frame and the duration of paging beam sweep. Following the duration of the paging beam sweep, subsequent paging occasions may be based on the prior paging occasion. In some cases, the paging beam sweep duration may be configured with respect to a number of downlink slots, and the UE 115-*a* may translate the indicated duration to an actual duration by accounting for one or more intervening slots, such as uplink slots or other slots (e.g., random access slots, slots within a RMSI search space, etc.), that might invalidate paging DCIs. In some cases, the base station 105-*a* may provide the paging configuration via a remaining minimum system information (RMSI) transmission, an other system information (OSI) transmission, radio resource control (RRC) signaling, or any combination thereof. Additionally or alternatively, the paging configuration may be provided via a medium access control (MAC) control element (CE), downlink control information (DCI), a handover message, one or more reference signals or reference signal sequences, or combinations thereof.

As indicated, in some cases the base station 105-*a* may indicate to the UE 115-*a* a configured monitoring occasion per transmitted SSB. In such cases, a monitoring window within the paging occasion, corresponding to the actually transmitted SSB-i, may be derived from following calculation:

$mod((X_{i\_s} \cdot n+f(i))$, number of slots per frame in paging numerology), in which:
 n=(paging SCS)/(15 kHz);
 $X_{i\_s}$ is the starting offset of paging occasion is, in which up to four paging occasions (i_s) may be defined, in some cases.

In some cases, $X_{i\_s}$ may be preconfigured or fixed for different values of is (e.g., configured values may be from the set $\{0, 1, \ldots, 9\}$). In some deployments, a search space for RMSI may be established. In some examples, for RMSI search space, $f=\lfloor i \cdot M \rfloor$, where M=1/2, if N=2 and Xi_s∈$\{0, 2, 5, 7\}$, M=1, if N=1 and Xi_s∈$\{0, 2, 5, 7\}$, M=2, if N=1 and Xi_s∈$\{0, 5\}$.

In some examples, a similar function $f(i)$ may be used for paging space. In some examples, $f(i)$ may indicate an additional offset corresponding to SSB-i, where i is the SSB index in terms of actually transmitted SSB ordering (e.g., an SSB index of actually transmitted SSBs provided in a system information block (SIB) or RRC signalling). For example, if the base station 105-*a* transmits SSB #0, 1, 3 but not SSB #2; then in the above equation, i corresponding to SSB #3 will take the value of 2. In some cases, N is the number of search space sets per slot, which can be configured as $\{1, 2\}$.

In other cases, the base station 105-*a* may indicate to the UE 115-*a* a configured starting location and a duration of a paging beam sweep. In such cases, a monitoring window within the paging occasion, corresponding to the actually transmitted SSB-i, may be derived from following calculation:

$mod((X_o \cdot n+i_s * f(d) \cdot n+f(i))$, number of slots per frame in paging numerology)

in which:
 n=(paging SCS)/(15 kHz);
 $X_0$ is the starting offset of paging occasion 0, and up to four paging occasions (i_s) may be defined (e.g., (i_s=$\{0, 1, 2, 3\}$);
 d is the paging beam sweep duration, in terms of consecutive downlink slots;
 $f(d)$ is the actual paging beam sweep duration, accounting for uplink slots and other places where paging DCI may be invalidated;
 $X_0$ may be configured or fixed in the for different values of i_s, in some cases, where configured values may be from the set $\{0, 1, \ldots, 9\}$.

Similarly as discussed above, for the RMSI search space, $f(i)=\lfloor i \cdot M \rfloor$, where M=1/2, if N=2 and Xi_s∈$\{0, 2, 5, 7\}$, M=1, if N=1 and Xi_s∈$\{0, 2, 5, 7\}$, M=2, if N=1 and Xi_s∈$\{0, 5\}$. In some cases, $f(i)$ is the additional offset corresponding to SSB-i, where i is the SSB index in terms of actually transmitted SSB ordering. For example, if the base station 105-*a* transmits SSB #0, 1, 3 but not SSB #2, then in above equation, i corresponding to SSB #3 will take the value of 2. N is the number of search space sets per slot, which can be configured as $\{1, 2\}$.

Thus, the mapping from paging occasion index to paging location may be configurable within a radio frame. In some cases, the signaling of the paging configuration may indicate which technique is being used to identify the location of the paging occasions. In some cases, the association between actual transmitted SSB and the monitoring window of PDCCH containing the paging DCI and the broadcast OSI DCI may be respectively configured via RMSI. Further, the default association between SSB index and monitoring window of PDCCH containing a paging DCI and a broadcast OSI DCI may be the same as that between SSB index and RMSI monitoring window.

In some cases, a paging frame (PF) and paging occasion (PO) may be determined as follows:
 (SFN mod T)=(T div N)*(UE_ID mod N) to derive a "first reference point"
 where,
  SFN: system frame number;
  T: discontinuous reception (DRX) cycle of the UE (T may be determined by the shortest of the UE specific DRX value, if allocated by upper layers, and a default DRX value broadcast in system information. If UE specific DRX is not configured by upper layers, the default value may be applied);
  nB: number of total paging occasions in T;
  N: min(T,nB);
  UE_ID: international mobile subscriber identity (IMSI) mod 1024
  Parameters nB and length of default DRX cycle may be signaled in SIB1;
  PF="first reference point"+offset;
  The offset may be signalled in SIB1.

Let is =floor (UE_ID/N) mod Ns; where, Ns=max (1, nB/T).

In some cases, a default association Ns is either 1 or 2. For Ns=1, PO is the set of RMSI monitoring occasions in the PF. For Ns=2, PO is the set of RMSI monitoring occasions in the first half frame (i_s=0) or the second half frame (i_s=1) of the PF.

In other examples, a defined search space information element (IE) may be used to define a "universal" paging/OSI monitoring window corresponding to all SSBs. In some other examples, a defined search space IE may be used to define a beam-specific paging/OSI monitoring window corresponding to different SSBs. In such cases, the base station 105-a may configure search space separately for up to 64 SSBs for both paging and OSI.

Figure 3:
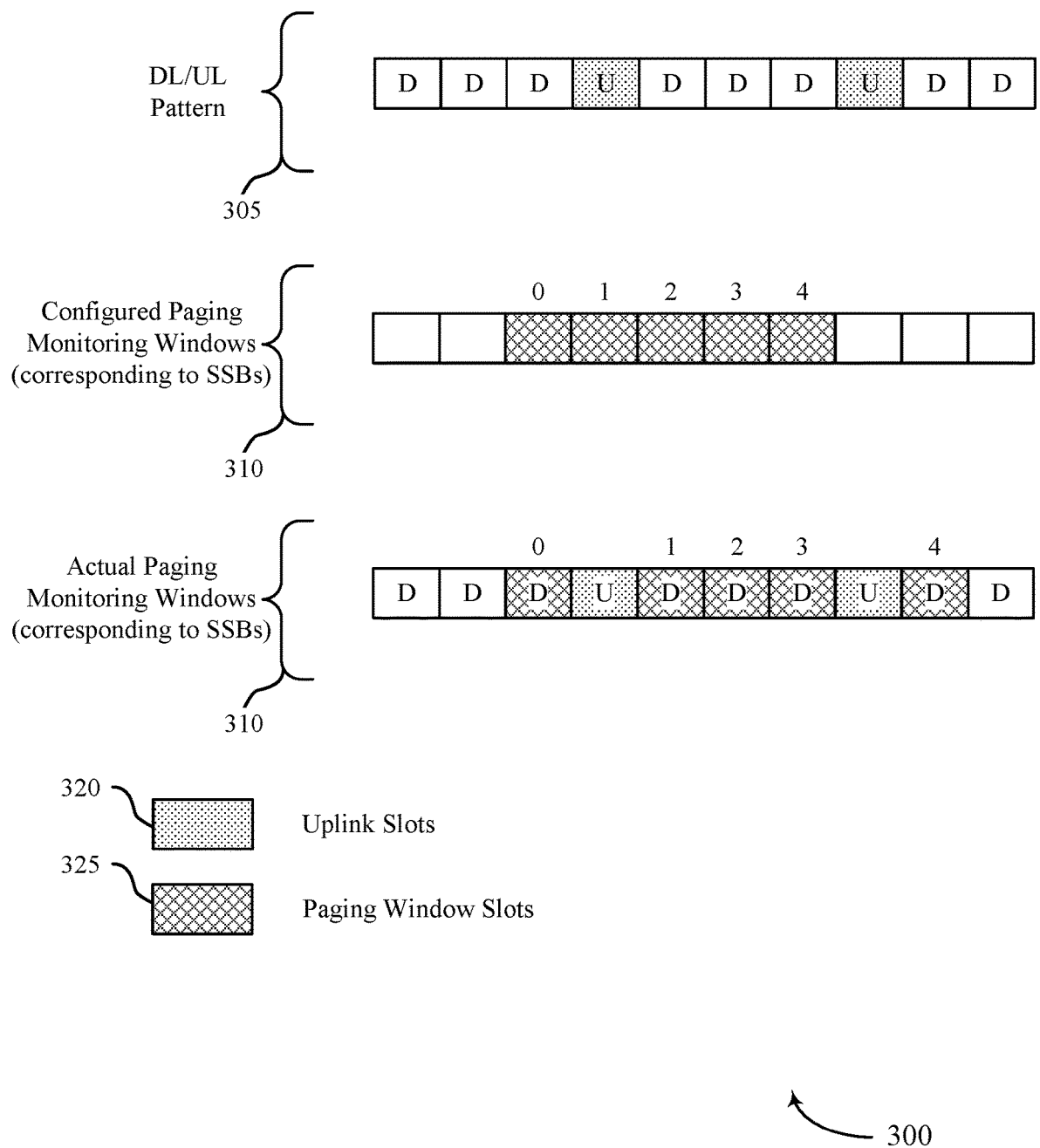
FIG. 3 illustrates an example of paging monitoring windows that support paging configuration in beamformed wireless communications in accordance with aspects of the present disclosure.

As indicated above, in some cases, a duration of a paging occasion may be adjusted to accommodate uplink slots or other slots that may invalidate a paging DCI. FIG. 3 illustrates an example of paging monitoring window 300 adjustment that supports paging configuration in beamformed wireless communications in accordance with aspects of the present disclosure. In some examples, paging monitoring windows 300 may implement aspects of wireless communications system 100 or 200.

In the example of FIG. 3, a base station may configure a downlink/uplink (D/U) pattern 305, in which a number of slots may be defined, which may include one or more uplink (U) slots 320 and other downlink (D) slots. Further, the base station may configure paging monitoring windows 310 having, for example, five paging window slots 325. However, if a one or more of the paging window slots 325 would collide with an invalid paging DCI slot, such as uplink slots 320 in this example, the paging monitoring window may be adjusted to accommodate such slots, resulting in actual paging monitoring windows 310. In some cases, RMSI monitoring windows do not get invalidated, and random access channel (RACH) occasions do get invalidated based on SSBs and downlink slot locations. In some cases, slots may be invalidated based on uplink locations (e.g., configured by tdd-dl-ul-config-common or tdd-dl-ul-config-common2), RACH locations, RMSI search space (e.g., if non-overlapping between RMSI and OSI is desired).

Figure 4:
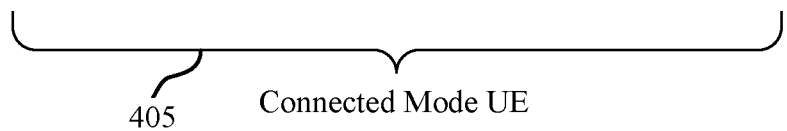
FIG. 4 illustrates an example of a different search space ordering based on SSB index and DCI location that supports paging configuration in beamformed wireless communications in accordance with aspects of the present disclosure.
Figure 4:
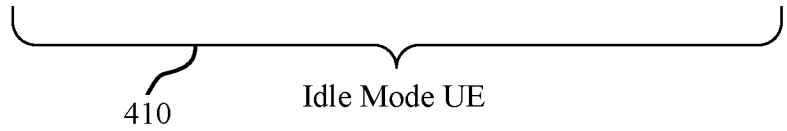

FIG. 4 illustrates an example of an ordering based on SSB index and DCI location 400 that supports paging configuration in beamformed wireless communications in accordance with aspects of the present disclosure. In some examples, ordering based on SSB index and DCI location 400 may implement aspects of wireless communications system 100 or 200. In some cases, the association between actual transmitted SSBs and the monitoring window of PDCCH containing the paging DCI and the broadcast OSI DCI may be respectively configured via RMSI. Further, actually transmitted SSBs may be configured through SIB1 and RRC (e.g., via servingcellConfigCommon information). In cases where SIB1 is used to indicate SSBs, two eight-bit strings may be provided, in which a first bit string (e.g., an "inOneGroup" bit string) indicates which group of SSBs are activated, and a second bit string (e.g., a "groupPresence" bit string) indicated which SSBs within each activated group are activated. In cases where RRC signaling is used to indicate SSBs, a 64 bit bitmap may provide an explicit indication for each SSB.

For example, SIB1 may configure "inOneGroup" as 10001000, and "groupPresence" as 11000000. Such a configuration means that a 1st, 5th, 9th and 13th SSB are transmitted, and the remaining SSBs are not transmitted. Further, RRC signalling may include a "ServingCellConfig-Common" that signals that the 1st, 5th, 6th, 9th, and 13th SSB are transmitted (i.e., the 64-bit bitmap indicates 10001100-10001000-0 . . . 0). In such cases, if the network orders paging DCI based on actually transmitted SSB, conveyed via servingCellConfigCommon, a connected mode UE may have paging search spaces according to paging DCI location indices and corresponding SSB indices as indicated at 405. However, an idle mode UE that identifies SSBs based on SIB1 may have paging DCI corresponding paging search spaces according to paging DCI location indices and corresponding SSB indices as indicated at 410. Thus, such an idle mode UE may wait for SSB #9 in location index #3 but never find SSB #9. Additionally, if the base station orders paging DCI based on actually transmitted SSB, conveyed via SIB1, connected mode UE may never receive paging DCI corresponding to SSB #6. Various examples provided herein, such as illustrated in FIG. 5, provide for ordering of SSB indices and DCI locations to provide search spaces that may be used by UEs.

FIG. 5 illustrates an example of an ordering based on SSB index and DCI location 500 that supports paging configuration in beamformed wireless communications in accordance with aspects of the present disclosure. In some examples, ordering based on SSB index and DCI location 500 may implement aspects of wireless communications system 100.

In this example, an ordered search space 505 may be ordered in the following manner. First, in terms of actually transmitted SSB, conveyed via SIB1 (e.g., ssb-positionIn-Burst in SystemInformationBlockType1), as indicated at 510 in FIG. 5, and second in terms of actually transmitted SSB, conveyed via RRC (e.g., ssb-PositionInBurst in ServingCellConfigCommon), as indicated at 515 in FIG. 5. In other cases, this ordering may be reversed, in which cases, the starting location of paging DCI may be configured differently between idle and connected mode UEs.

In some cases, the first order and the second order of search spaces may be interleaved. For example, assume that the paging DCI corresponding to each SSB in both a first plurality, or set, of paging occasions and a second plurality, or set, of paging occasions occur after every two slots. The first plurality occurs at even slots and the second plurality occurs at odd slots. Idle mode UEs may not have any ambiguity because they may not search paging in odd slots, and connected mode UEs know sufficient information, and thus also do not have ambiguity.

Figure 6:
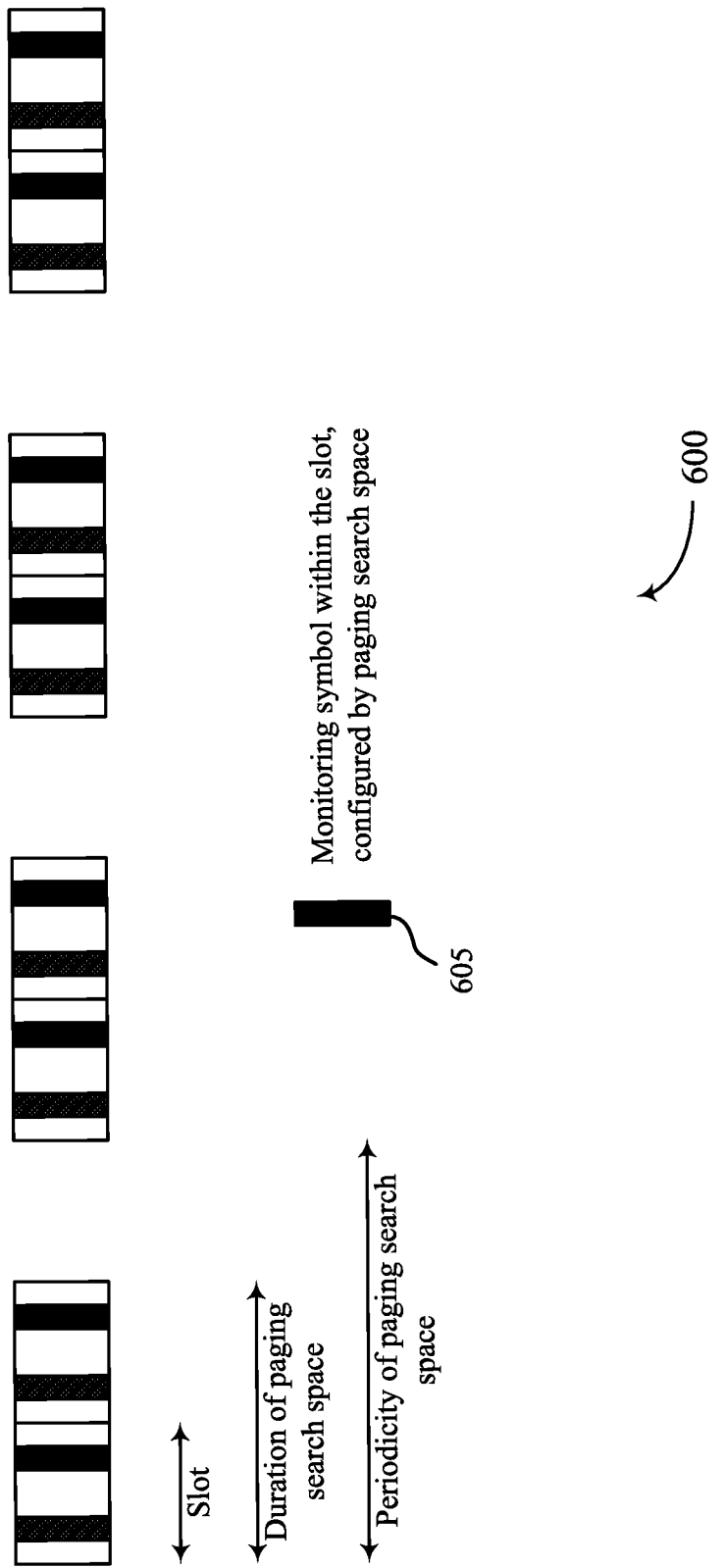
FIG. 6 illustrates an example of a paging search space configuration with beam swept SSB that supports paging configuration in beamformed wireless communications in accordance with aspects of the present disclosure.

FIG. 6 illustrates an example of a paging search space configuration 600 with beam swept SSB that supports paging configuration in beamformed wireless communications in accordance with aspects of the present disclosure. As discussed herein, NR allows the network (e.g., via a base station) to configure a paging search space to a UE. The paging search space allows network to flexibly configure periodicity, offset, duration and monitoring symbols within a slot. Hence, network may use such parameters, along with the explicitly configured location of the first paging monitoring occasion (e.g., a PDCCH monitoring occasion) of each paging occasion. The paging search space configuration 600 shows each slot having a plurality of symbols, with multiple monitoring symbols configured (shaded in FIG. 6).

Figure 7:
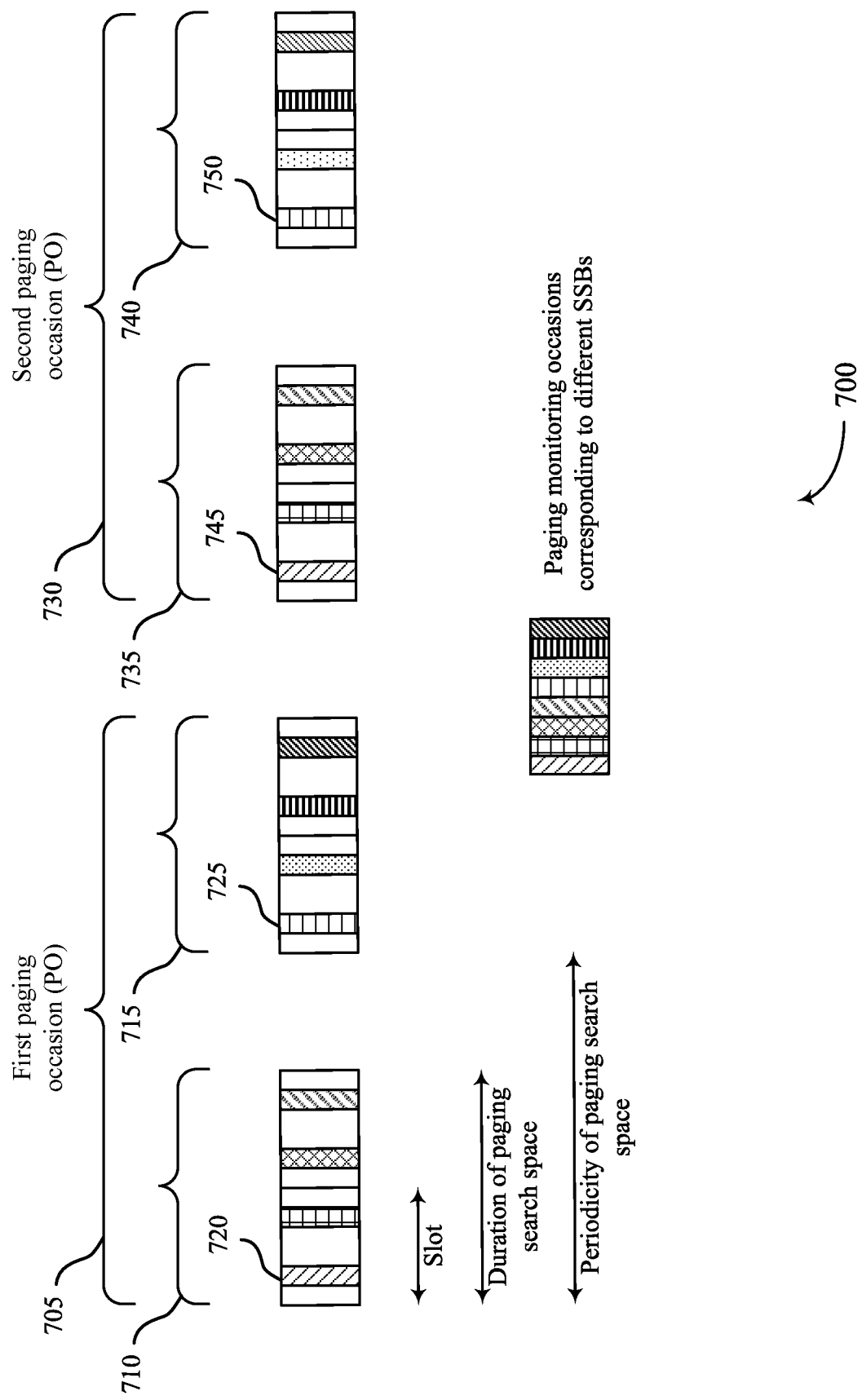
FIG. 7 illustrates an example of mapping between SSBs and paging monitoring occasions for a paging search space configuration with beam swept SSB that supports paging configuration in beamformed wireless communications in accordance with aspects of the present disclosure.

FIG. 7 illustrates an example of mapping between SSBs and paging monitoring occasions for a paging search space configuration 700 with beam swept SSB that supports paging configuration in beamformed wireless communications in accordance with aspects of the present disclosure. The network may define a non-default association between SSBs and paging monitoring occasions. For example, the network may employ a configured paging search space such as the paging search space configuration 700. More specifically, the network may use the explicitly configured location of the first paging monitoring occasion of the paging occasion and other parameters (e.g., monitoringSlotPeriodicityAndOffset, duration, and monitoringSymbolsWithinSlot) of the paging search space configuration 700 to define the association. As such, no additional RRC parameter is introduced.

The paging search space configuration 700 provides a one-to-one mapping between SSBs and paging monitoring occasions (e.g., PDCCH monitoring occasions). Differently shaded symbols in FIG. 7 indicate paging monitoring occasions corresponding to different SSBs. The SSBs may be consecutively mapped to different paging monitoring occasions. If there are multiple paging monitoring occasions within a slot, different SSBs may be mapped to different paging monitoring occasions within a slot. In the paging search space configuration 700, two paging monitoring occasions are defined within a slot. Thus, two different SSBs may be mapped to the two paging monitoring occasions within each slot.

In the paging search space configuration 700, a first paging occasion 705 (e.g., the $N^{th}$ paging occasion) may include two paging search space instances 710 and 715, each including two slots. Multiple paging monitoring occasions may be configured for each slot as shown, with different SSBs mapped to the different paging monitoring occasions of a respective slot. For example, a first paging monitoring occasion of the first paging occasion 705 (corresponding to the first actually transmitted SSB) may be monitoring symbol 720, and a fifth paging monitoring occasion of the first paging occasion 705 (corresponding to the first actually transmitted SSB) may be monitoring symbol 725. Similarly, a second paging occasion 730 (e.g., the $(N+1)^{th}$ paging occasion) may include two paging search space instances 735 and 740, each including two slots. For the second paging occasion 730, a first paging monitoring occasion may be monitoring symbol 745, and a fifth monitoring occasion may be monitoring symbol 750.

Alternatively or additionally, a non-default association between SSBs and paging monitoring occasions may be defined (as supported, e.g., by a technical specification) as follows. The network may confirm that the location of the first paging monitoring occasion, if explicitly configured, matches with a valid PDCCH monitoring occasion defined by the paging search space. Starting from the 1st paging PDCCH monitoring occasion, N valid consecutive monitoring occasions may be defined based on parameters of the paging search space (e.g., monitoringSlotPeriodicityAndOffset, duration, and monitoringSymbolsWithinSlot), which may be set forth in a paging search space information element (IE), where N is the number of actually transmitted SSBs. SSB indices may be consecutively mapped to the N valid paging monitoring occasions. Each SSB may be mapped to only one valid paging monitoring occasion within one paging occasion. As above, if there are multiple paging monitoring occasions within a slot, different SSBs may be mapped to different paging monitoring occasions within the slot.

If the network has mixed slots (i.e., combinations of downlink/sidelink (D/S) and uplinks (U) within a slot), the network may configure the paging search space so that the paging monitoring occasions (e.g., paging PDCCH monitoring occasions) do not occur in slots that do not have sufficient resources for scheduling a paging physical downlink shared channel (PDSCH). However, the availability of paging PDSCH resources may not impact the validity of paging PDCCH monitoring occasions.

Figure 8:
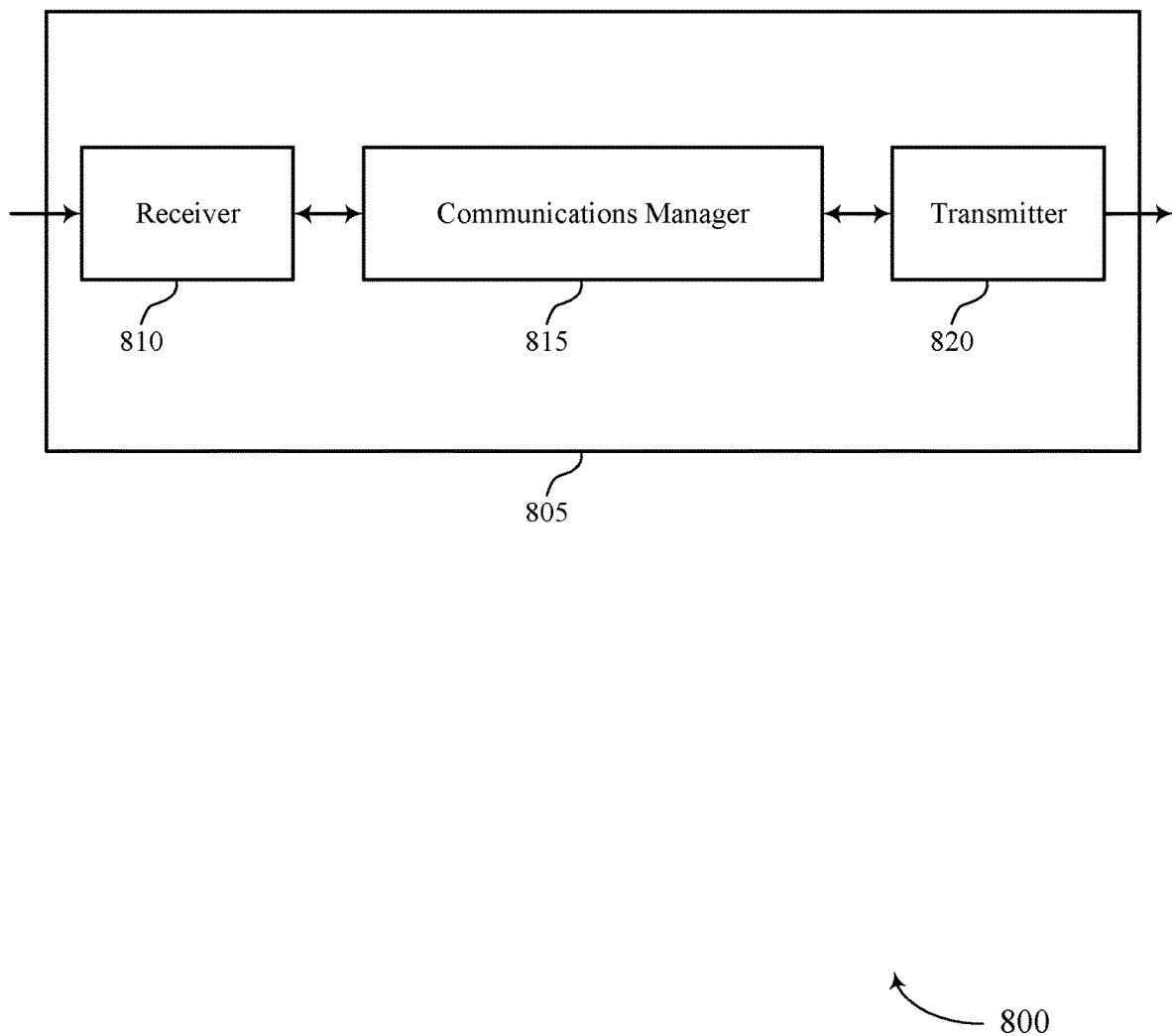
FIGS. 8 and 9 show block diagrams of devices that support paging configuration in beamformed wireless communications in accordance with aspects of the present disclosure.

FIG. 8 shows a block diagram 800 of a device 805 that supports paging configuration in beamformed wireless communications in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to paging configuration in beamformed wireless communications, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a paging configuration from a base station. The paging configuration may indicate a paging occasion during which the UE is to monitor for pages that are transmitted from the base station. A location of the paging occasion may be based at least in part on at least one synchronization signal block (SSB) transmitted by the base station. A mapping between a paging occasion index and the location of the paging occasion may be indicated in the paging configuration. The UE may monitor for a paging transmission from the base station during the paging occasion, and may receive a page from the base station based on the monitoring. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
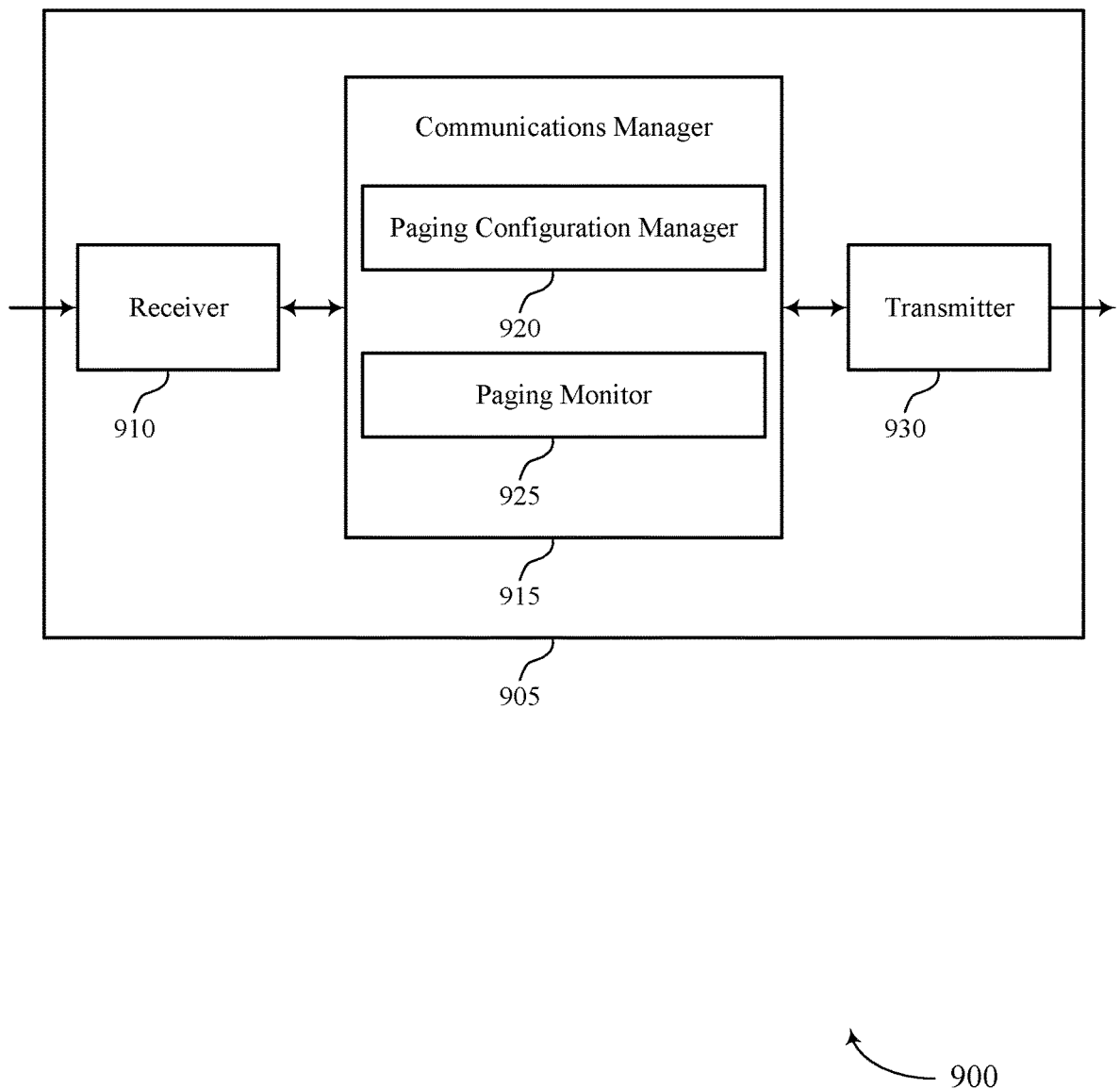

FIG. 9 shows a block diagram 900 of a device 905 that supports paging configuration in beamformed wireless communications in accordance with aspects of the present disclosure. The device 905 may be an example of aspects of a device 805 or a UE 115 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to paging configuration in beamformed wireless communications, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a paging configuration manager 920 and a paging monitor 925. The communications manager 915 may be an example of aspects of the communications manager 1110 described herein.

The paging configuration manager 920 may receive a paging configuration from a base station. The paging configuration may indicate a paging occasion during which the UE is to monitor for pages that are transmitted from the base station. A location of the paging occasion may be based at least in part on at least one synchronization signal block (SSB) transmitted by the base station. A mapping between a paging occasion index and the location of the paging occasion may be indicated in the paging configuration.

The paging monitor 925 may monitor for a paging transmission from the base station during the paging occasion and may receive a page from the base station based on the monitoring.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
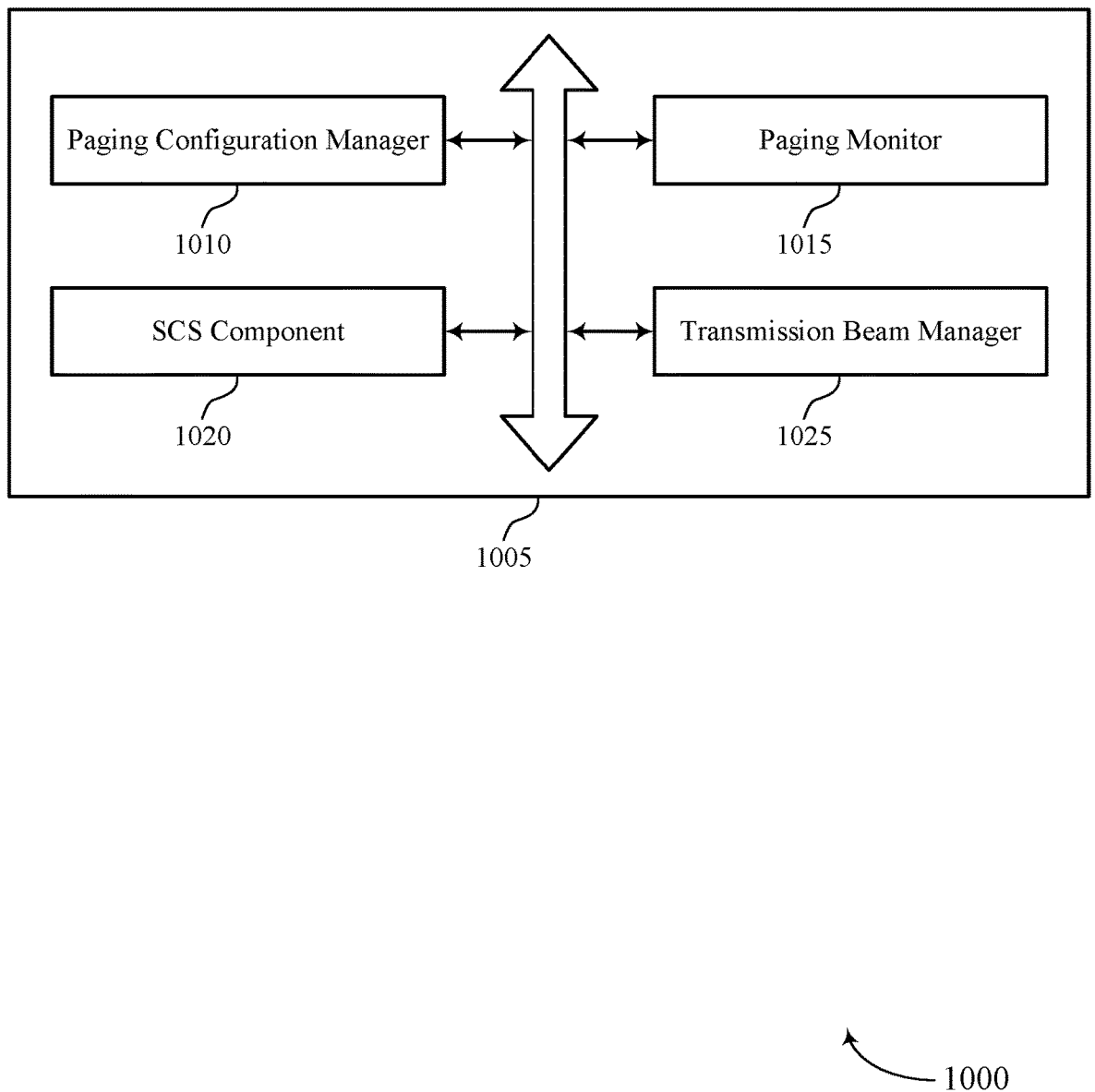
FIG. 10 shows a block diagram of a communications manager that supports paging configuration in beamformed wireless communications in accordance with aspects of the present disclosure.

FIG. 10 shows a block diagram 1000 of a communications manager 1005 that supports paging configuration in beamformed wireless communications in accordance with aspects of the present disclosure. The communications manager 1005 may be an example of aspects of the communications manager 815, the communications manager 915, or the communications manager 1110 described herein. The communications manager 1005 may include a paging configuration manager 1010, a paging monitor 1015, a subcarrier spacing (SCS) component 1020, and a transmission beam manager 1025. Each of these modules may communicate, directly or indirectly, with one another (e.g., via one or more buses).

The paging configuration manager 1010 may receive a paging configuration from a base station. The paging configuration may indicate a paging occasion during which the UE is to monitor for pages that are transmitted from the base station. A location of the paging occasion may be based at least in part on at least one synchronization signal block (SSB) transmitted by the base station. A mapping between a paging occasion index and the location of the paging occasion may be indicated in the paging configuration.

In some examples, the paging configuration manager 1010 may determine the duration of the page monitoring window based on the number of downlink slots and one or more slots that are unavailable for paging transmissions between a starting slot associated with the starting location and the last slot of the number of downlink slots. In some cases, the paging configuration may further indicate a starting location of the paging occasion of the base station within a paging frame. In some cases, the paging occasion may be associated with a page monitoring window, and a duration of the page monitoring window may be based on a beam sweep duration of the paging occasion. In some cases, a starting location of the page monitoring window may be based on an offset value associated with the paging occasion. In some cases, the starting location of the page monitoring window may be based on an index value of the at least one synchronization signal block (SSB) transmitted by the base station. In some cases, the paging configuration may indicate a number of downlink slots of the page monitoring window. In some cases, a demodulation reference signal (DMRS) of the paging transmission may be spatially quasi-co-located (QCL) with the SSB that is associated with a page monitoring window of the paging transmission. In some cases, a paging search space is unavailable if the paging search space overlaps with uplink resources or valid PRACH occasions.

In some cases, the paging configuration may be received from the base station via one or more of a remaining minimum system information (RMSI) transmission, an other system information (OSI) transmission, a radio resource configuration (RRC) transmission, or any combinations thereof. In some cases, the paging configuration may be received from the base station via one or more of a DCI transmission, a medium access control (MAC) control element (CE) transmission, a handover message, a reference signal sequence, or any combinations thereof.

The paging monitor 1015 may monitor for a paging transmission from the base station during the paging occasion. In some examples, the paging monitor 1015 may receive a page from the base station based on the monitoring.

The SCS component 1020 may indicate an SCS that is to be used for determining an offset for monitored slots, a duration of a monitoring window, or combinations thereof. In some cases, a duration of the page monitoring window may be based on an SCS configured for beamformed transmission beams.

The transmission beam manager 1025 may manage beamforming parameters for beamformed transmissions. In some cases, the pages may be transmitted via beamformed transmission beams.

Figure 11:
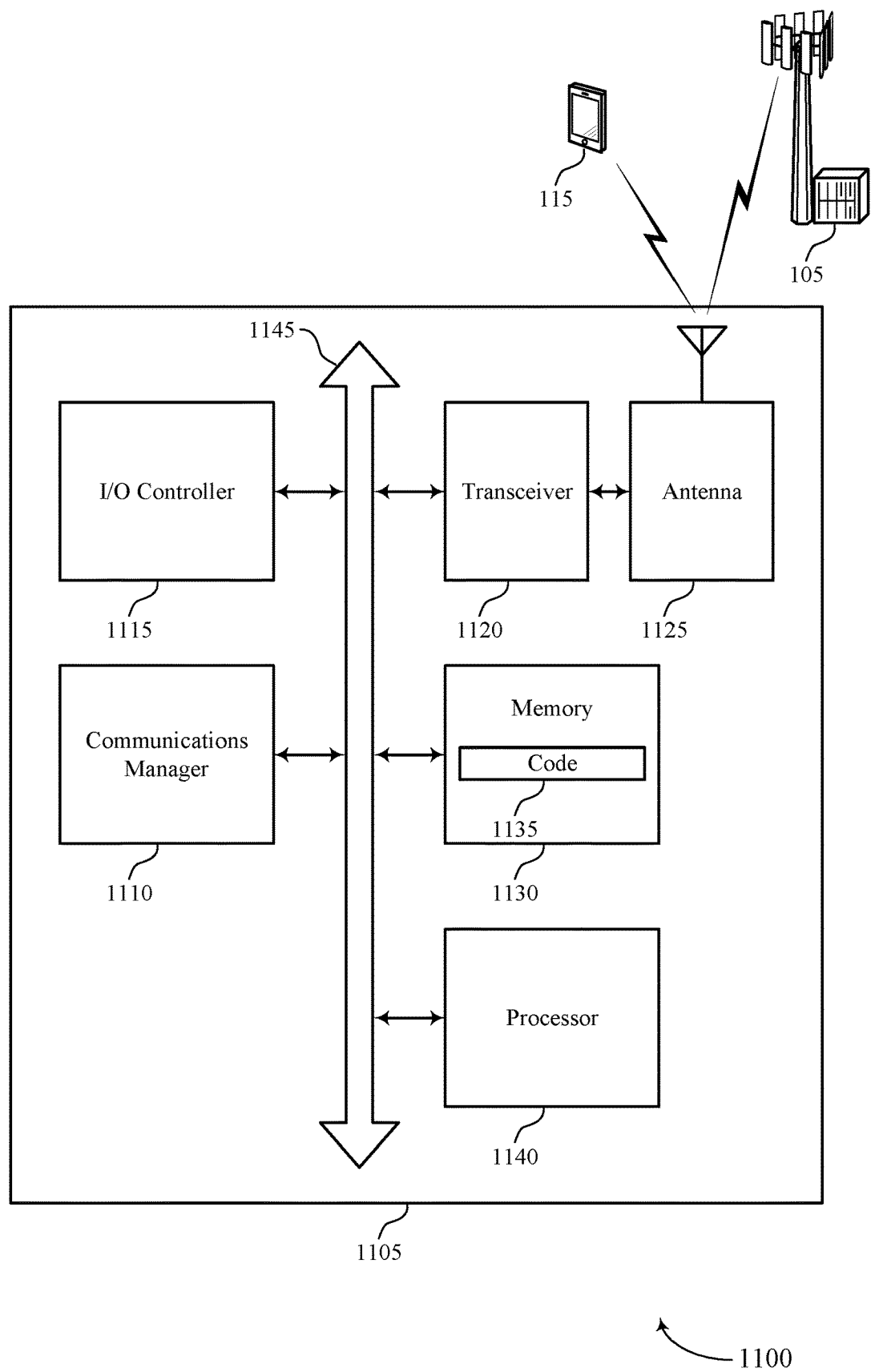
FIG. 11 shows a diagram of a system including a device that supports paging configuration in beamformed wireless communications in accordance with aspects of the present disclosure.

FIG. 11 shows a diagram of a system 1100 including a device 1105 that supports paging configuration in beamformed wireless communications in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive a paging configuration from a base station. The paging configuration may indicate a paging occasion during which the UE is to monitor for pages that are transmitted from the base station.

A location of the paging occasion may be based at least in part on at least one synchronization signal block (SSB) transmitted by the base station. A mapping between a paging occasion index and the location of the paging occasion may be indicated in the paging configuration. The UE may monitor for a paging transmission from the base station during the paging occasion, and may receive a page from the base station based on the monitoring.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired links, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed by a processor (e.g., the processor 1140), cause the device 1105 to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting paging configuration in beamformed wireless communications).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
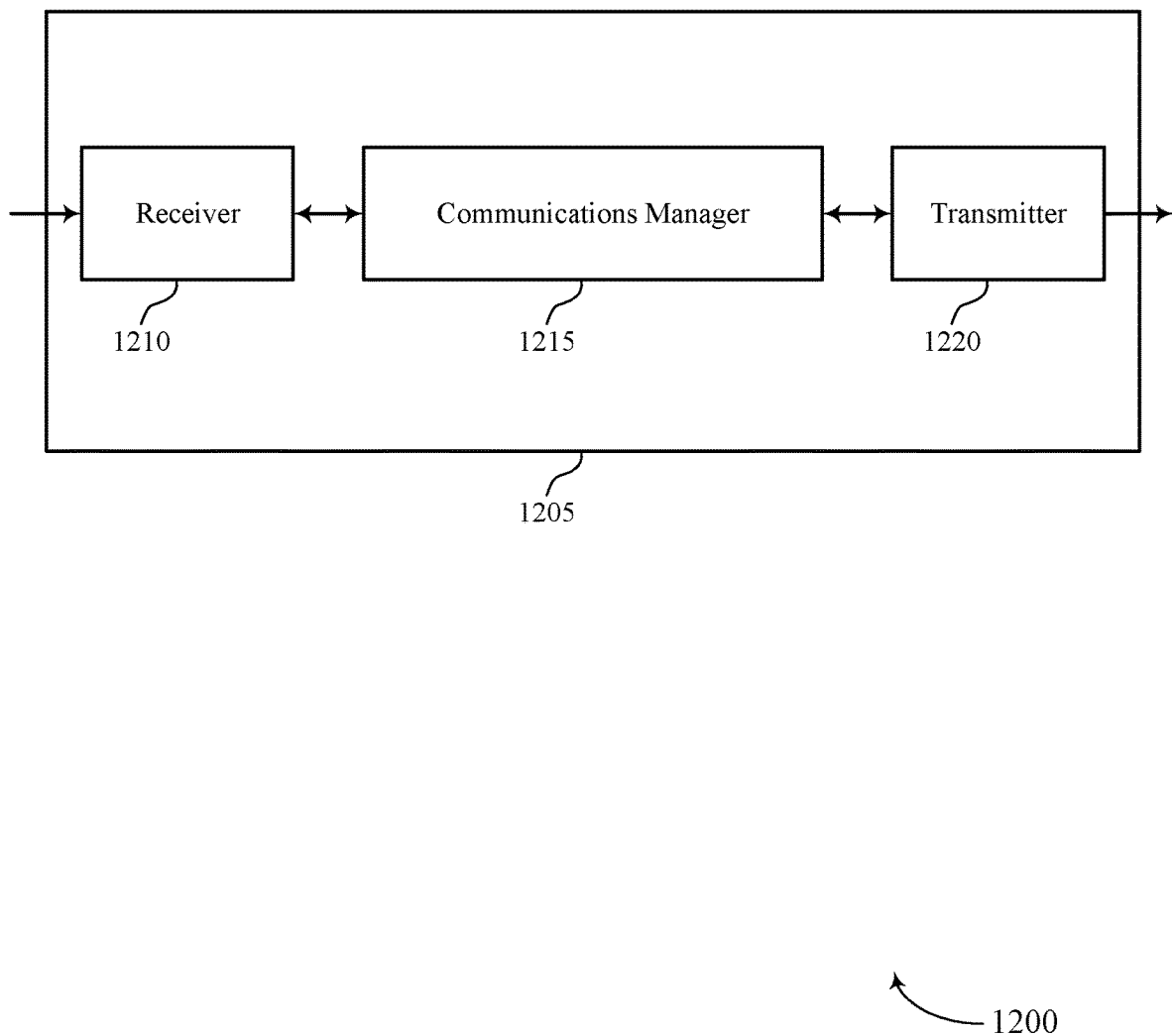
FIGS. 12 and 13 show block diagrams of devices that support paging configuration in beamformed wireless communications in accordance with aspects of the present disclosure.

FIG. 12 shows a block diagram 1200 of a device 1205 that supports paging configuration in beamformed wireless communications in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to paging configuration in beamformed wireless communications, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit a paging configuration to a UE. The paging configuration may indicate one or more paging occasions during which the UE is to monitor for pages that are transmitted from the base station. A location of the paging occasion may be based at least in part on at least one synchronization signal block (SSB) transmitted by the base station. A mapping between a paging occasion index and the location of the paging occasion may be indicated in the paging configuration. The communications manager 1215 may transmit a page to the UE during at least one of the paging occasions, and may receive paging response from the UE responsive to the page. The communications manager 1215 may also identify a first plurality, or set, of paging occasions corresponding to a first set of synchronization signal blocks (SSBs) and a second plurality, or set, of paging occasions corresponding to a second set of SSBs for transmitting paging DCI, where the first plurality of paging occasions and the second plurality of paging occasions are different. The communications manager 1215 may transmit the paging DCI based on the ordering, and may order transmissions of the paging DCI according to the first plurality of paging occasions and second plurality of paging occasions. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
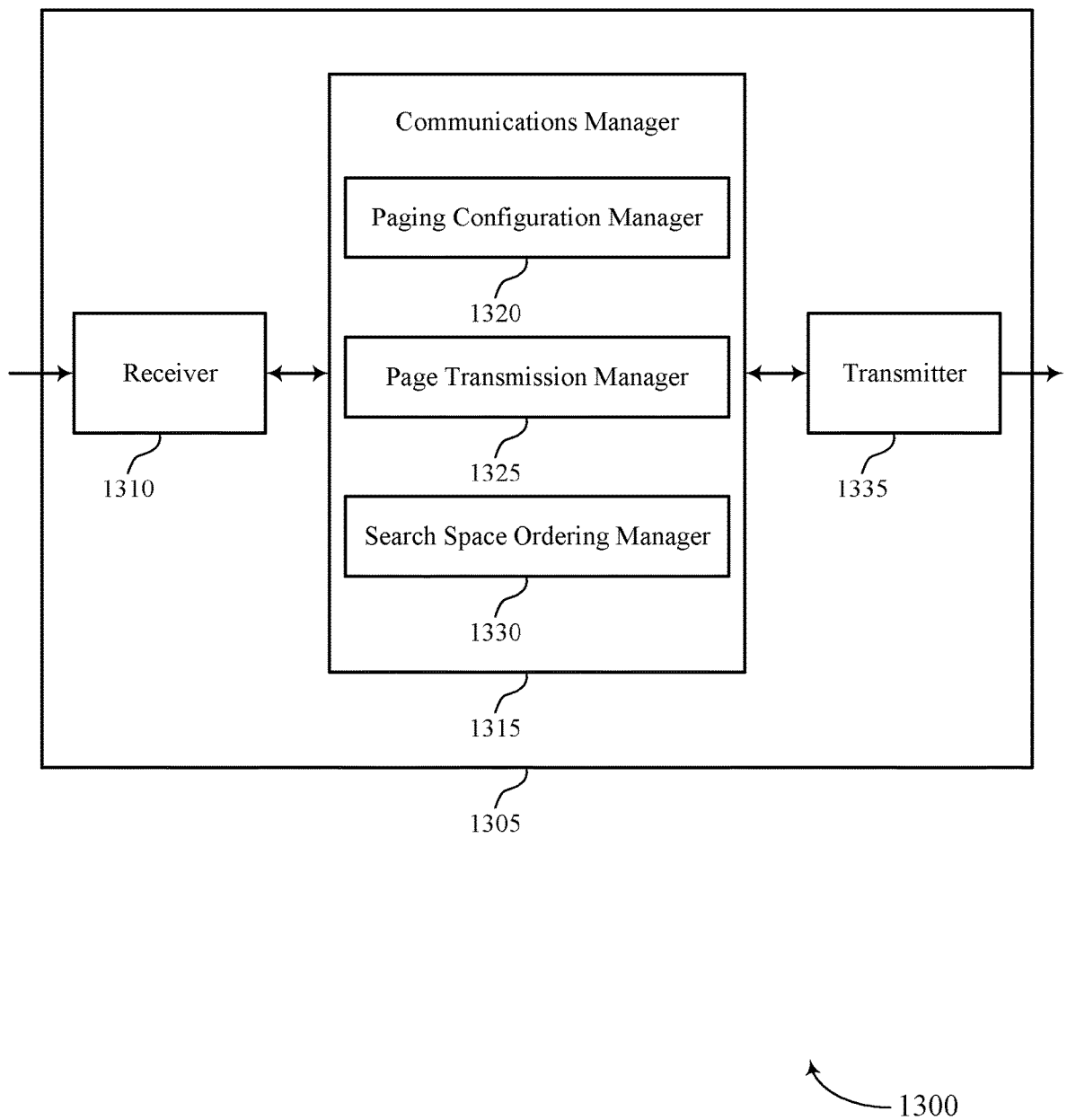

FIG. 13 shows a block diagram 1300 of a device 1305 that supports paging configuration in beamformed wireless communications in accordance with aspects of the present disclosure. The device 1305 may be an example of aspects of a device 1205 or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to paging configuration in beamformed wireless communications, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a paging configuration manager 1320, a page transmission manager 1325, and a search space ordering manager 1330. The communications manager 1315 may be an example of aspects of the communications manager 1510 described herein.

The paging configuration manager 1320 may transmit a paging configuration to a UE. The paging configuration may indicate one or more paging occasions during which the UE is to monitor for pages that are transmitted from the base station. A location of the paging occasion may be based at least in part on at least one synchronization signal block (SSB) transmitted by the base station. A mapping between a paging occasion index and the location of the paging occasion may be indicated in the paging configuration.

The page transmission manager 1325 may transmit a page to the UE during at least one of the paging occasions, and may receive paging response from the UE responsive to the page.

In some cases, the paging configuration manager 1320 may identify a first plurality, or set, of paging occasions corresponding to a first set of synchronization signal blocks (SSBs) and a second plurality, or set, of paging occasions corresponding to a second set of SSBs for transmitting paging DCI, where the first plurality of paging occasions and the second plurality of paging occasions are different.

In some cases, the search space ordering manager 1330 may order transmissions of the paging DCI according to the first plurality of paging occasions and second plurality of paging occasions. The communications manager 1315 may transmit the paging DCI based on the ordering.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
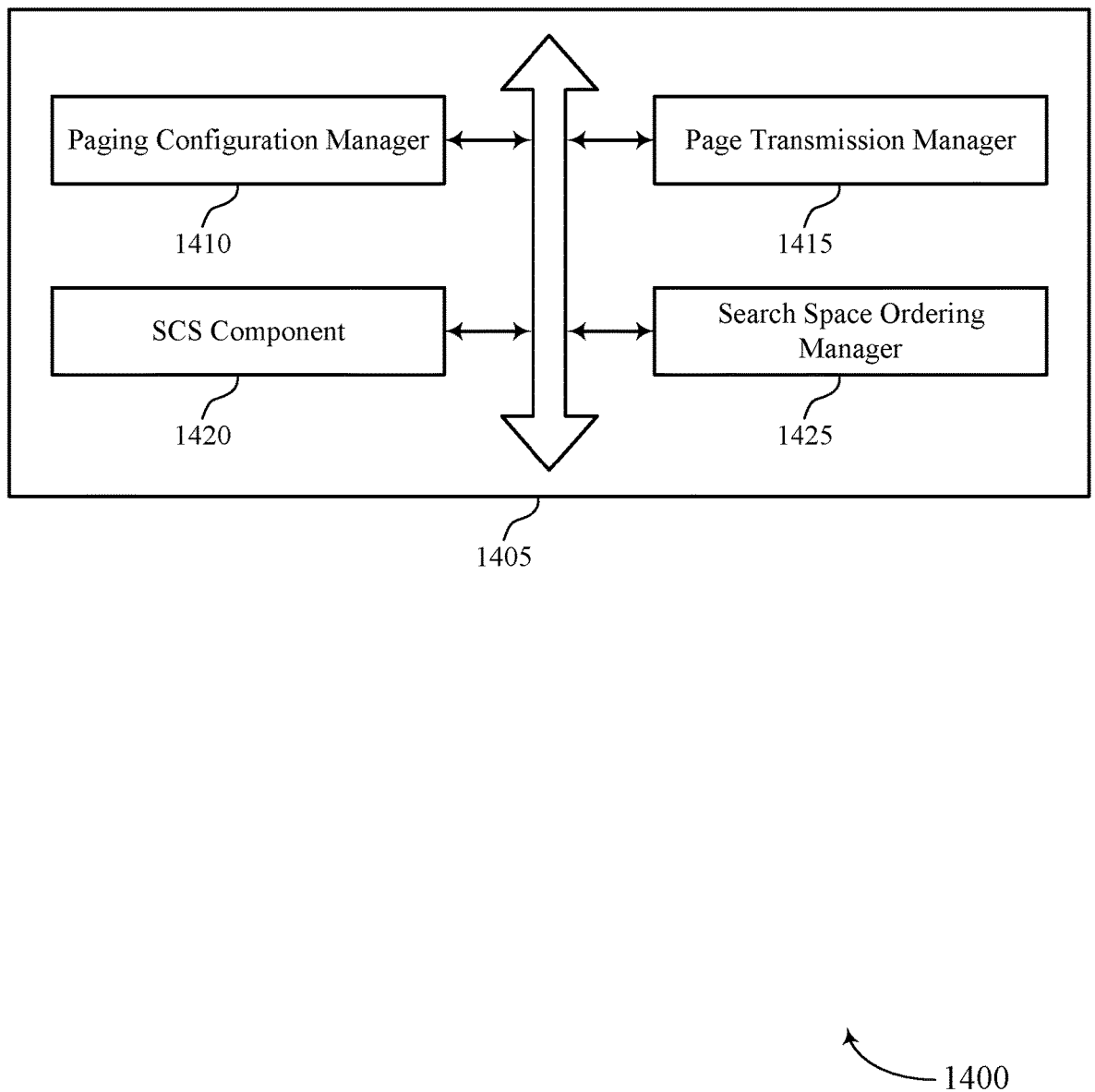
FIG. 14 shows a block diagram of a communications manager that supports paging configuration in beamformed wireless communications in accordance with aspects of the present disclosure.

FIG. 14 shows a block diagram 1400 of a communications manager 1405 that supports paging configuration in beamformed wireless communications in accordance with aspects of the present disclosure. The communications manager 1405 may be an example of aspects of the communications manager 1215, the communications manager 1315, or the communications manager 1510 described herein. The communications manager 1405 may include a paging configuration manager 1410, a page transmission manager 1415, a SCS component 1420, and a search space ordering manager 1425. Each of these modules may communicate, directly or indirectly, with one another (e.g., via one or more buses).

The paging configuration manager 1410 may transmit a paging configuration to a UE. The paging configuration may indicate one or more paging occasions during which the UE is to monitor for pages that are transmitted from the base station. A location of the paging occasion may be based at least in part on at least one synchronization signal block (SSB) transmitted by the base station. A mapping between a paging occasion index and the location of the paging occasion may be indicated in the paging configuration.

In some examples, the paging configuration manager 1410 may identify a first plurality of paging occasions corresponding to a first set of synchronization signal blocks (SSBs) and a second plurality of paging occasions corresponding to a second set of SSBs for transmitting paging DCI, where the first plurality of paging occasions and the second plurality of paging occasions are different.

In some examples, the paging configuration manager 1410 may determine the duration of the page monitoring window based on the number of downlink slots and one or more slots that are unavailable for paging transmissions between a starting slot associated with the starting location and the last slot of the number of downlink slots. In some cases, the paging configuration further indicates a starting location of the paging occasion of the base station within a paging frame. In some cases, the paging occasion is associated with a page monitoring window, and a duration of the page monitoring window is based on a beam sweep duration of the paging occasion. In some cases, a starting location of the page monitoring window is based on an offset value associated with the paging occasion. In some cases, the starting location of the page monitoring window is based on an index value of a synchronization signal block (SSB) transmitted by the base station. In some cases, the paging configuration indicates a number of downlink slots of the page monitoring window.

In some cases, the paging configuration is transmitted via one or more of a remaining minimum system information (RMSI) transmission, an other system information (OSI) transmission, a radio resource configuration (RRC) transmission, or any combinations thereof. In some cases, the paging configuration is transmitted via one or more of a DCI transmission, a medium access control (MAC) control element (CE) transmission, a handover message, a reference signal sequence, or any combinations thereof.

The page transmission manager 1415 may transmit a page to the UE during at least one of the paging occasions. In some examples, the page transmission manager 1415 may receive a paging response from the UE responsive to the page.

The search space ordering manager 1425 may order transmissions of the paging DCI according to the first plurality, or set, of paging occasions and second plurality, or set, of paging occasions. In some examples, the paging configuration manager 1410 may transmit the paging DCI based on the ordering.

In some cases, the first plurality of paging occasions may correspond to actually transmitted SSBs indicated in a SIB transmission, and the second plurality of paging occasions may correspond to actually transmitted SSBs indicated in RRC signaling. In some cases, the first plurality of paging occasions may correspond to actually transmitted SSBs indicated in resource control (RRC) signaling, and the second plurality of paging occasions may correspond to actually transmitted SSBs indicated in a SIB transmission. In some cases, the first plurality of paging occasions may be identified by a first bitmap provided in a SIB that is transmitted by the base station. In some cases, the second plurality of paging occasions may be identified by a second bitmap provided in RRC signaling. In some cases, the second bitmap may be capable of indicating each potential actually transmitted SSBs (i.e., potential SSB for transmission), and the first bitmap may be capable of indicating certain subsets of potential actually transmitted SSBs (i.e., potential SSBs for transmission).

The SCS component 1420 may indicate an SCS for communications from the base station. In some cases, a duration of the page monitoring window is based on an SCS configured for the beamformed transmission beams.

Figure 15:
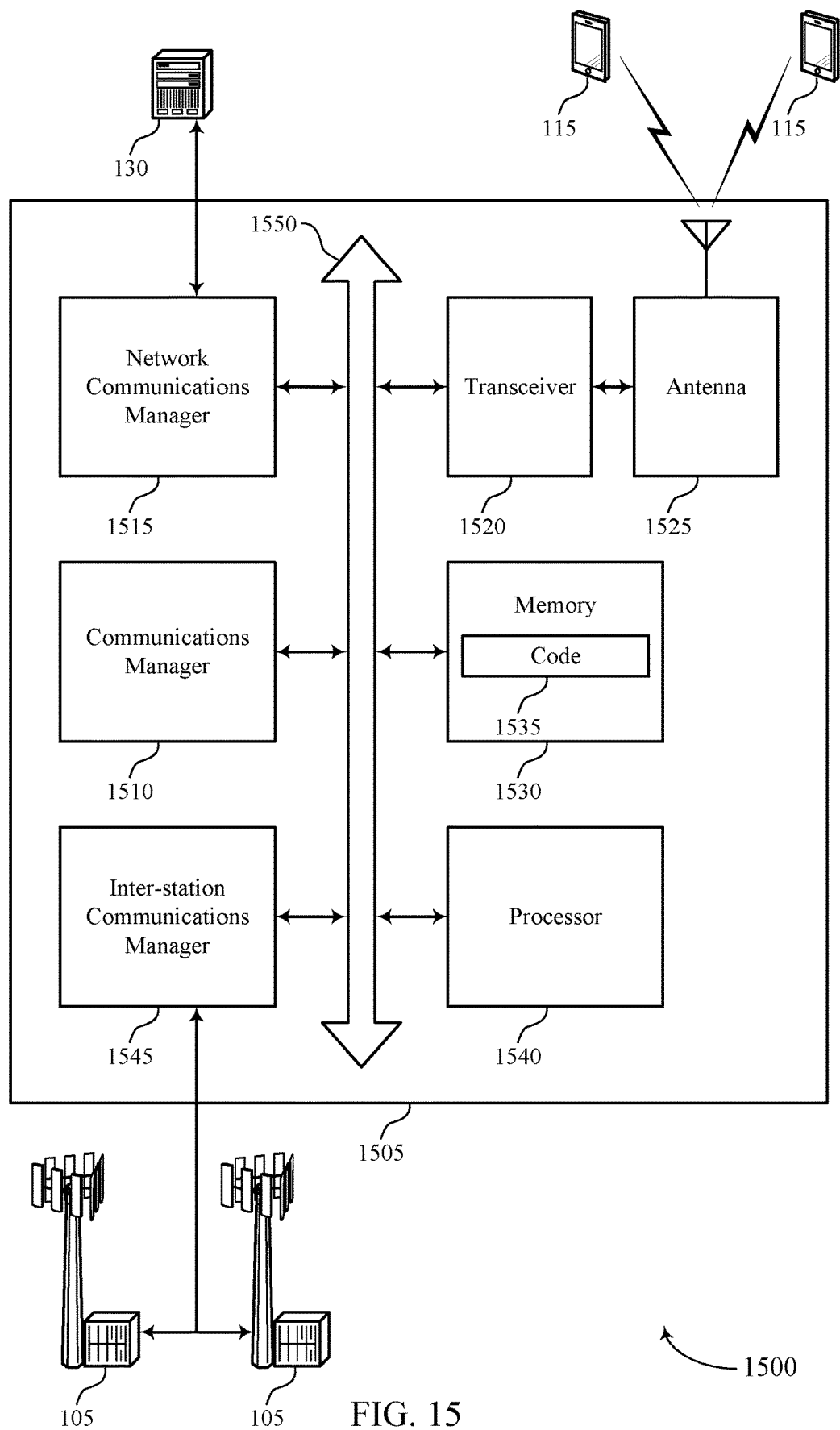
FIG. 15 shows a diagram of a system including a device that supports paging configuration in beamformed wireless communications in accordance with aspects of the present disclosure.

FIG. 15 shows a diagram of a system 1500 including a device 1505 that supports paging configuration in beamformed wireless communications in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit a paging configuration to a UE. The paging configuration may indicate one or more paging occasions during which the UE is to monitor for pages that are transmitted from the base station. A location of the paging occasion may be based at least in part on at least one synchronization signal block (SSB) transmitted by the base station. A mapping between a paging occasion index and the location of the paging occasion may be indicated in the paging configuration. The communications manager 1510 may transmit a page to the UE during at least one of the paging occasions, and may receive paging response from the UE responsive to the page. The communications manager 1510 may also identify a first plurality, or set, of paging occasions corresponding to a first set of synchronization signal blocks (SSBs) and a second plurality, or set, of paging occasions corresponding to a second set of SSBs for transmitting paging DCI, where the first plurality of paging occasions and the second plurality of paging occasions are different. The communications manager 1510 may order transmissions of the paging DCI according to the first plurality of paging occasions and second plurality of paging occasions, and may transmit the paging DCI based on the ordering.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired links, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device 1505 to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting paging configuration in beamformed wireless communications).

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

Figure 16:
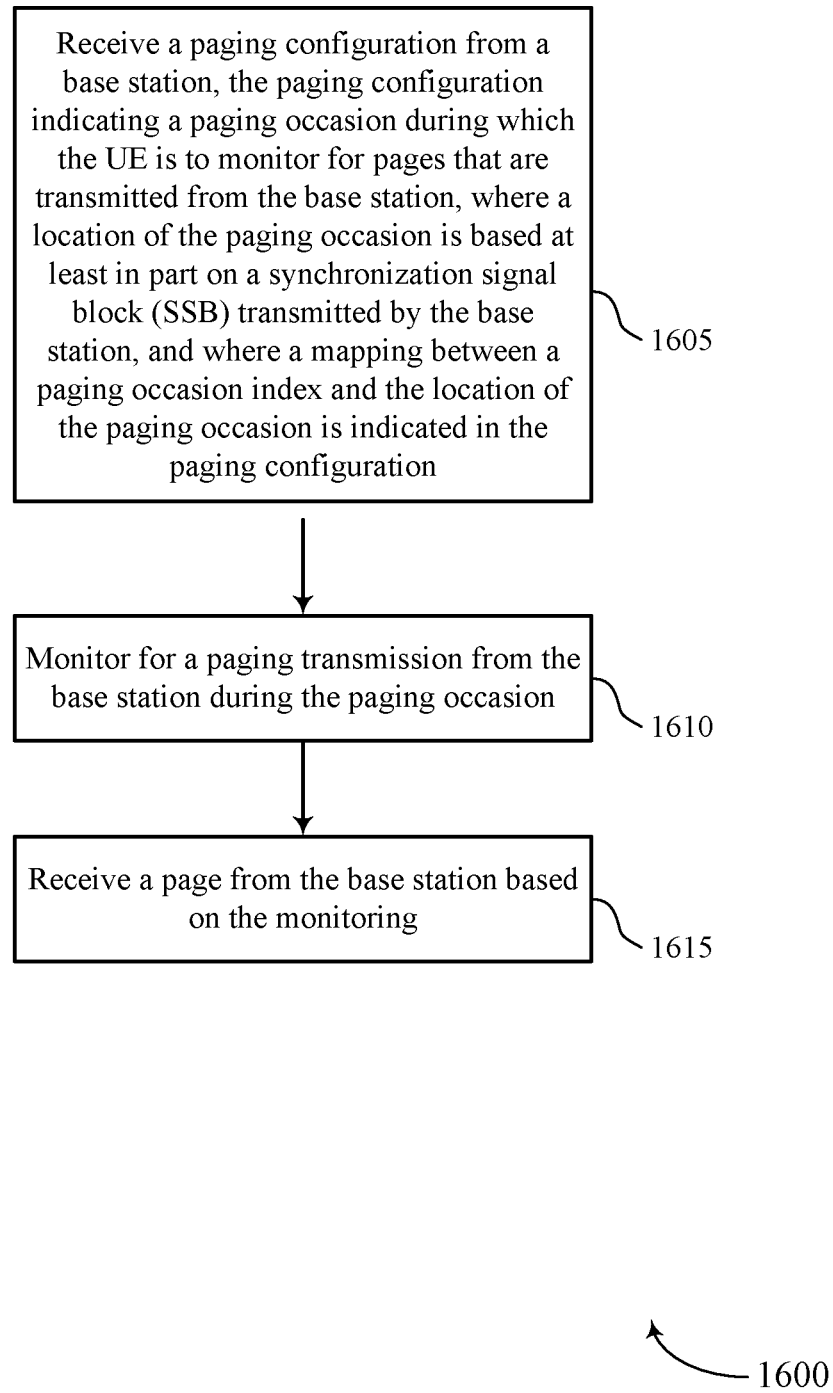
FIGS. 16 through 20 show flowcharts illustrating methods that support paging configuration in beamformed wireless communications in accordance with aspects of the present disclosure.

FIG. 16 shows a flowchart illustrating a method 1600 that supports paging configuration in beamformed wireless communications in accordance with aspects of the present disclosure. The operations of method 1600 may be implemented by a UE 115 or components thereof as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive a paging configuration from a base station. The paging configuration may indicate a paging occasion during which the UE is to monitor for pages that are transmitted from the base station. A location of the paging occasion may be based at least in part on at least one synchronization signal block (SSB) transmitted by the base station. A mapping between a paging occasion index and the location of the paging occasion may be indicated in the paging configuration. The operations of 1605 may be performed according to the methods described herein. In some examples, aspects of the operations of 1605 may be performed by a paging configuration manager as described with reference to FIGS. 8 through 11. Additionally or alternatively, means for performing 1605 may, but not necessarily, include, for example, antenna 1125, transceiver 1120, communications manager 1110, memory 1130 (including code 1135), processor 1140 and/or bus 1145.

At 1610, the UE may monitor for a paging transmission from the base station during the paging occasion. The operations of 1610 may be performed according to the methods described herein. In some examples, aspects of the operations of 1610 may be performed by a paging monitor as described with reference to FIGS. 8 through 11. Additionally or alternatively, means for performing 1610 may, but not necessarily, include, for example, antenna 1125, transceiver 1120, communications manager 1110, memory 1130 (including code 1135), processor 1140 and/or bus 1145.

At 1615, the UE may receive a page from the base station based on the monitoring. The operations of 1615 may be performed according to the methods described herein. In some examples, aspects of the operations of 1615 may be performed by a paging monitor as described with reference to FIGS. 8 through 11. Additionally or alternatively, means for performing 1615 may, but not necessarily, include, for example, antenna 1125, transceiver 1120, communications manager 1110, memory 1130 (including code 1135), processor 1140 and/or bus 1145.

Figure 17:
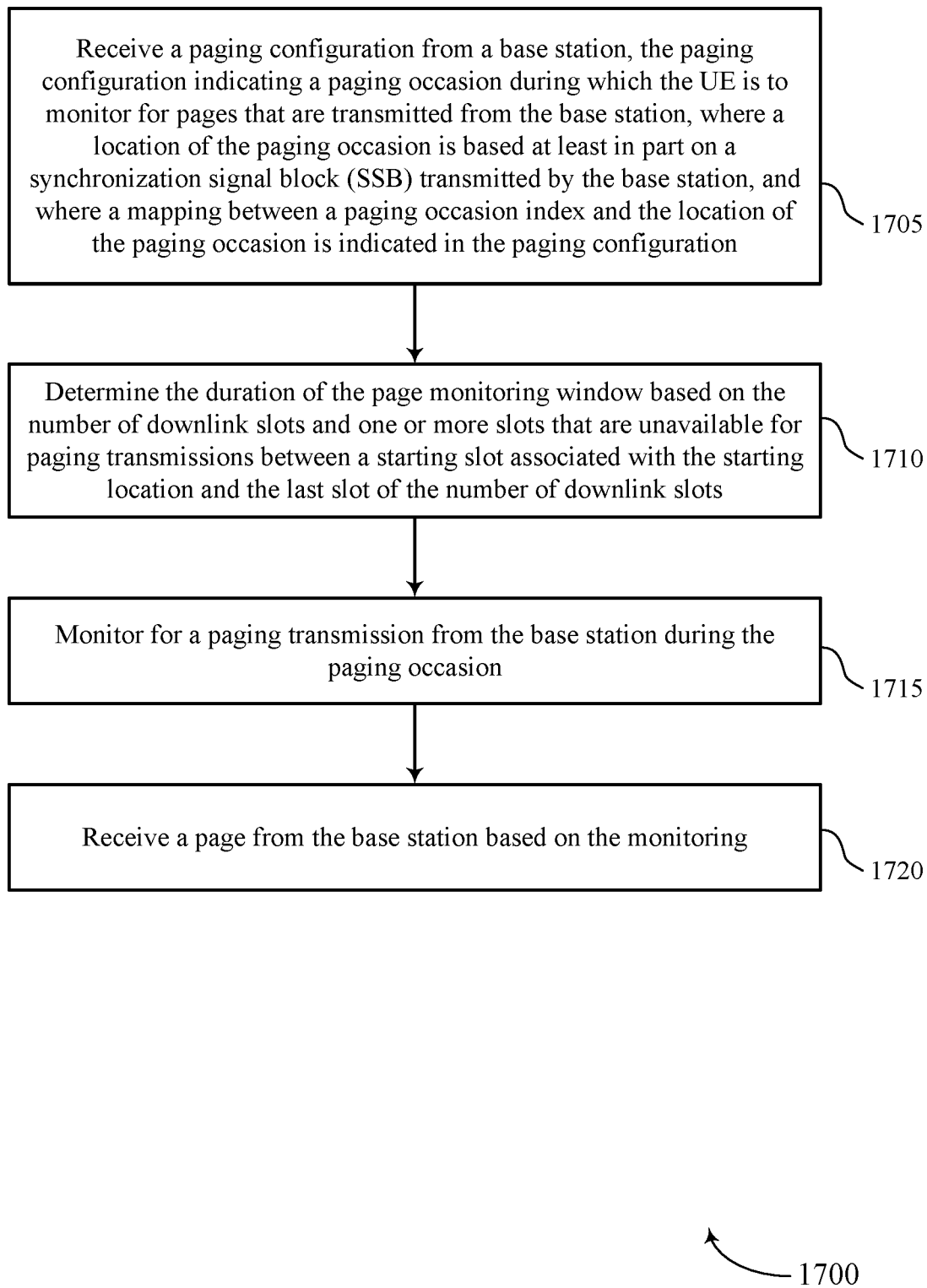

FIG. 17 shows a flowchart illustrating a method 1700 that supports paging configuration in beamformed wireless communications in accordance with aspects of the present disclosure. The operations of method 1700 may be implemented by a UE 115 or components thereof as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive a paging configuration from a base station. The paging configuration may indicate a paging occasion during which the UE is to monitor for pages that are transmitted from the base station. A location of the paging occasion may be based at least in part on at least one synchronization signal block (SSB) transmitted by the base station. A mapping between a paging occasion index and the location of the paging occasion may be indicated in the paging configuration. The operations of 1705 may be performed according to the methods described herein. In some examples, aspects of the operations of 1705 may be performed by a paging configuration manager as described with reference to FIGS. 8 through 11. Additionally or alternatively, means for performing 1705 may, but not necessarily, include, for example, antenna 1125, transceiver 1120, communications manager 1110, memory 1130 (including code 1135), processor 1140 and/or bus 1145.

In some cases, the paging occasion may be associated with a page monitoring window, and a duration of the page monitoring window may be based on a beam sweep duration of the paging occasion. In some cases, a starting location of the page monitoring window may be based on an offset value associated with the paging occasion. In some cases, the paging configuration may indicate a number of downlink slots of the page monitoring window.

At 1710, the UE may determine the duration of the page monitoring window, for example, based on the number of downlink slots and one or more slots that are unavailable for paging transmissions between a starting slot associated with the starting location and the last slot of the number of downlink slots. The operations of 1710 may be performed according to the methods described herein. In some examples, aspects of the operations of 1710 may be performed by a paging configuration manager as described with reference to FIGS. 8 through 11. Additionally or alternatively, means for performing 1710 may, but not necessarily, include, for example, transceiver 1120, communications manager 1110, memory 1130 (including code 1135), processor 1140 and/or bus 1145.

At 1715, the UE may monitor for a paging transmission from the base station during the paging occasion. The operations of 1715 may be performed according to the methods described herein. In some examples, aspects of the operations of 1715 may be performed by a paging monitor as described with reference to FIGS. 8 through 11. Additionally or alternatively, means for performing 1715 may, but not necessarily, include, for example, antenna 1125, transceiver 1120, communications manager 1110, memory 1130 (including code 1135), processor 1140 and/or bus 1145.

At 1720, the UE may receive a page from the base station based on the monitoring. The operations of 1720 may be performed according to the methods described herein. In some examples, aspects of the operations of 1720 may be performed by a paging monitor as described with reference to FIGS. 8 through 11. Additionally or alternatively, means for performing 1720 may, but not necessarily, include, for example, antenna 1125, transceiver 1120, communications manager 1110, memory 1130 (including code 1135), processor 1140 and/or bus 1145.

Figure 18:
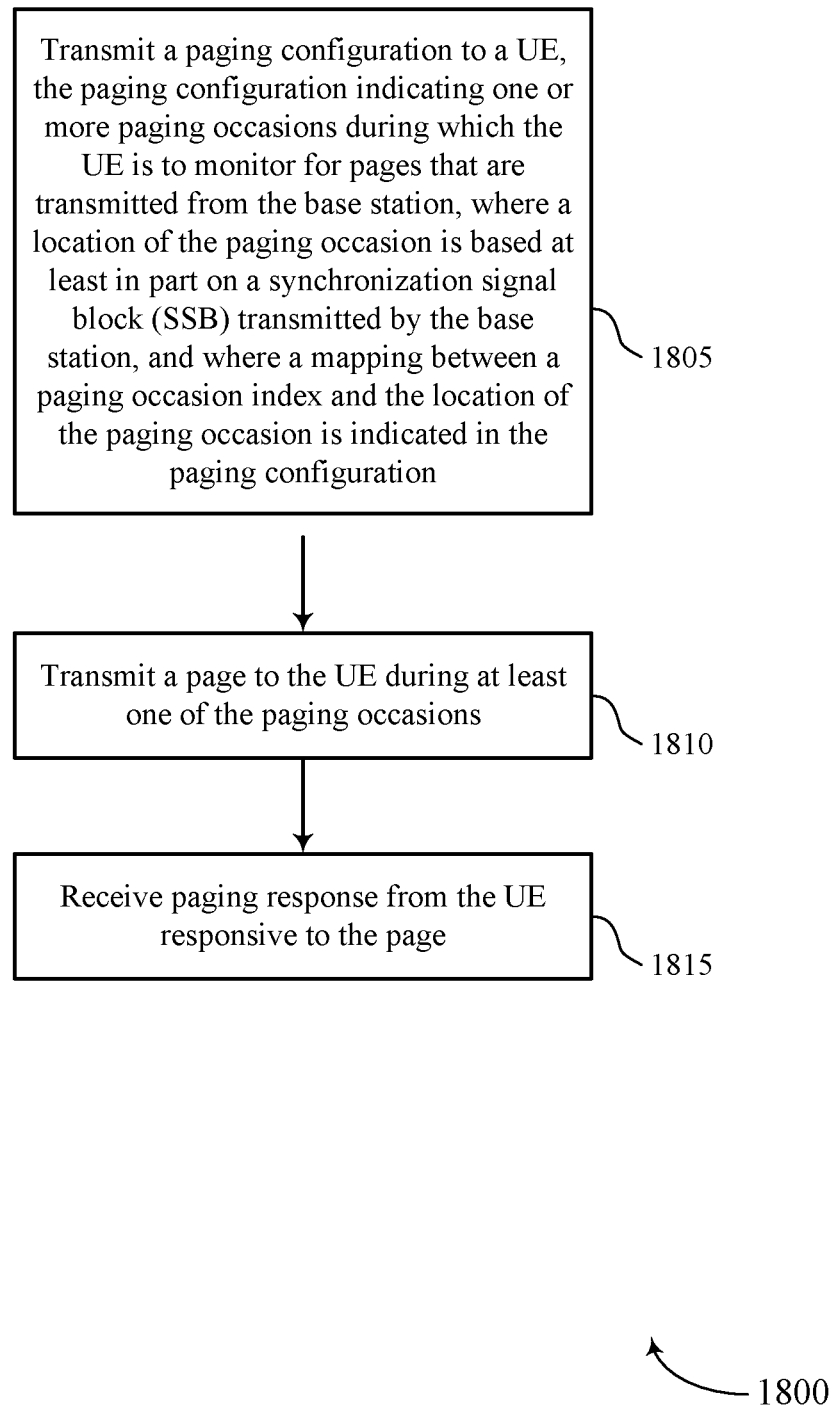

FIG. 18 shows a flowchart illustrating a method 1800 that supports paging configuration in beamformed wireless communications in accordance with aspects of the present disclosure. The operations of method 1800 may be implemented by a base station 105 or components thereof as described herein. For example, the operations of method 1800 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1805, the base station may transmit a paging configuration to a UE. The paging configuration may indicate one or more paging occasions during which the UE is to monitor for pages that are transmitted from the base station. A location of the paging occasion may be based at least in part on at least one synchronization signal block (SSB) transmitted by the base station. A mapping between a paging occasion index and the location of the paging occasion may be indicated in the paging configuration. The operations of 1805 may be performed according to the methods described herein. In some examples, aspects of the operations of 1805 may be performed by a paging configuration manager as described with reference to FIGS. 12 through 15. Additionally or alternatively, means for performing 1805 may, but not necessarily, include, for example, antenna 1525, transceiver 1520, communications manager 1510, memory 1530 (including code 1535), network communications manager 1515, inter-station communications manager 1545, processor 1540 and/or bus 1550.

At 1810, the base station may transmit a page to the UE during at least one of the paging occasions. The operations of 1810 may be performed according to the methods described herein. In some examples, aspects of the operations of 1810 may be performed by a page transmission manager as described with reference to FIGS. 12 through 15. Additionally or alternatively, means for performing 1810 may, but not necessarily, include, for example, antenna 1525, transceiver 1520, communications manager 1510, memory 1530 (including code 1535), network communications manager 1515, inter-station communications manager 1545, processor 1540 and/or bus 1550.

At 1815, the base station may receive paging response from the UE responsive to the page. The operations of 1815 may be performed according to the methods described herein. In some examples, aspects of the operations of 1815 may be performed by a page transmission manager as described with reference to FIGS. 12 through 15. Additionally or alternatively, means for performing 1815 may, but not necessarily, include, for example, antenna 1525, transceiver 1520, communications manager 1510, memory 1530 (including code 1535), network communications manager 1515, inter-station communications manager 1545, processor 1540 and/or bus 1550.

Figure 19:
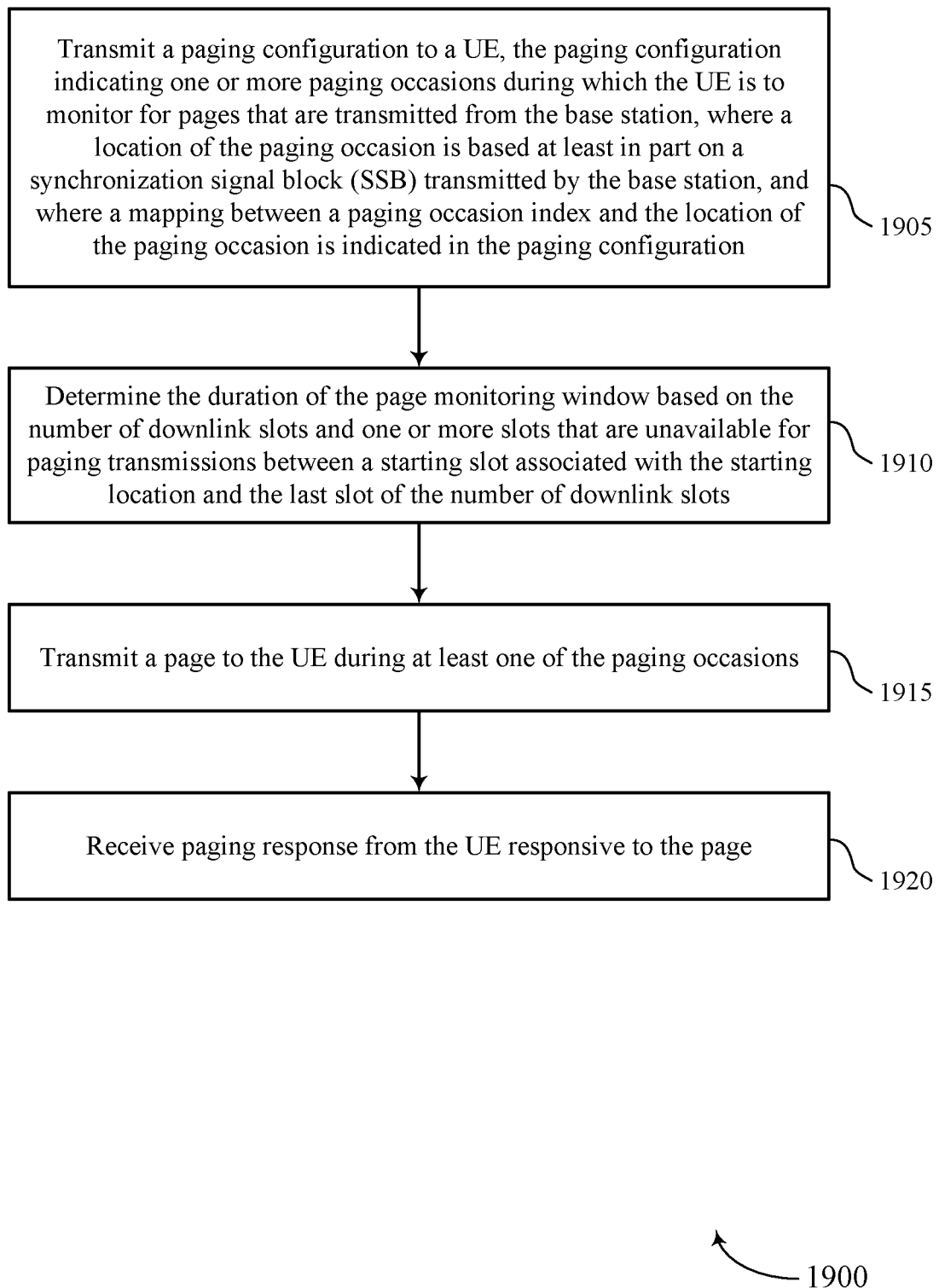

FIG. 19 shows a flowchart illustrating a method 1900 that supports paging configuration in beamformed wireless communications in accordance with aspects of the present disclosure. The operations of method 1900 may be implemented by a base station 105 or components thereof as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may transmit a paging configuration to a UE. The paging configuration may indicate one or more paging occasions during which the UE is to monitor for pages that are transmitted from the base station. A location of the paging occasion may be based at least in part on at least one synchronization signal block (SSB) transmitted by the base station. A mapping between a paging occasion index and the location of the paging occasion is indicated in the paging configuration. The operations of 1905 may be performed according to the methods described herein. In some examples, aspects of the operations of 1905 may be performed by a paging configuration manager as described with reference to FIGS. 12 through 15. Additionally or alternatively, means for performing 1905 may, but not necessarily, include, for example, antenna 1525, transceiver 1520, communications manager 1510, memory 1530 (including code 1535), network communications manager 1515, inter-station communications manager 1545, processor 1540 and/or bus 1550.

In some cases, the paging occasion may be associated with a page monitoring window, and a duration of the page monitoring window may be based on a beam sweep duration of the paging occasion. In some cases, a starting location of the page monitoring window may be based on an offset value associated with the paging occasion. In some cases, the paging configuration may indicate a number of downlink slots of the page monitoring window.

At 1910, the base station may determine the duration of the page monitoring window, for example, based on the number of downlink slots and one or more slots that are unavailable for paging transmissions between a starting slot associated with the starting location and the last slot of the number of downlink slots. The operations of 1910 may be performed according to the methods described herein. In some examples, aspects of the operations of 1910 may be performed by a paging configuration manager as described with reference to FIGS. 12 through 15. Additionally or alternatively, means for performing 1910 may, but not necessarily, include, for example, transceiver 1520, communications manager 1510, memory 1530 (including code 1535), network communications manager 1515, inter-station communications manager 1545, processor 1540 and/or bus 1550.

At 1915, the base station may transmit a page to the UE during at least one of the paging occasions. The operations of 1915 may be performed according to the methods described herein. In some examples, aspects of the operations of 1915 may be performed by a page transmission manager as described with reference to FIGS. 12 through 15. Additionally or alternatively, means for performing 1915 may, but not necessarily, include, for example, antenna 1525, transceiver 1520, communications manager 1510, memory 1530 (including code 1535), network communications manager 1515, inter-station communications manager 1545, processor 1540 and/or bus 1550.

At 1920, the base station may receive paging response from the UE responsive to the page. The operations of 1920 may be performed according to the methods described herein. In some examples, aspects of the operations of 1920 may be performed by a page transmission manager as described with reference to FIGS. 12 through 15. Additionally or alternatively, means for performing 1920 may, but not necessarily, include, for example, antenna 1525, transceiver 1520, communications manager 1510, memory 1530 (including code 1535), network communications manager 1515, inter-station communications manager 1545, processor 1540 and/or bus 1550.

Figure 20:
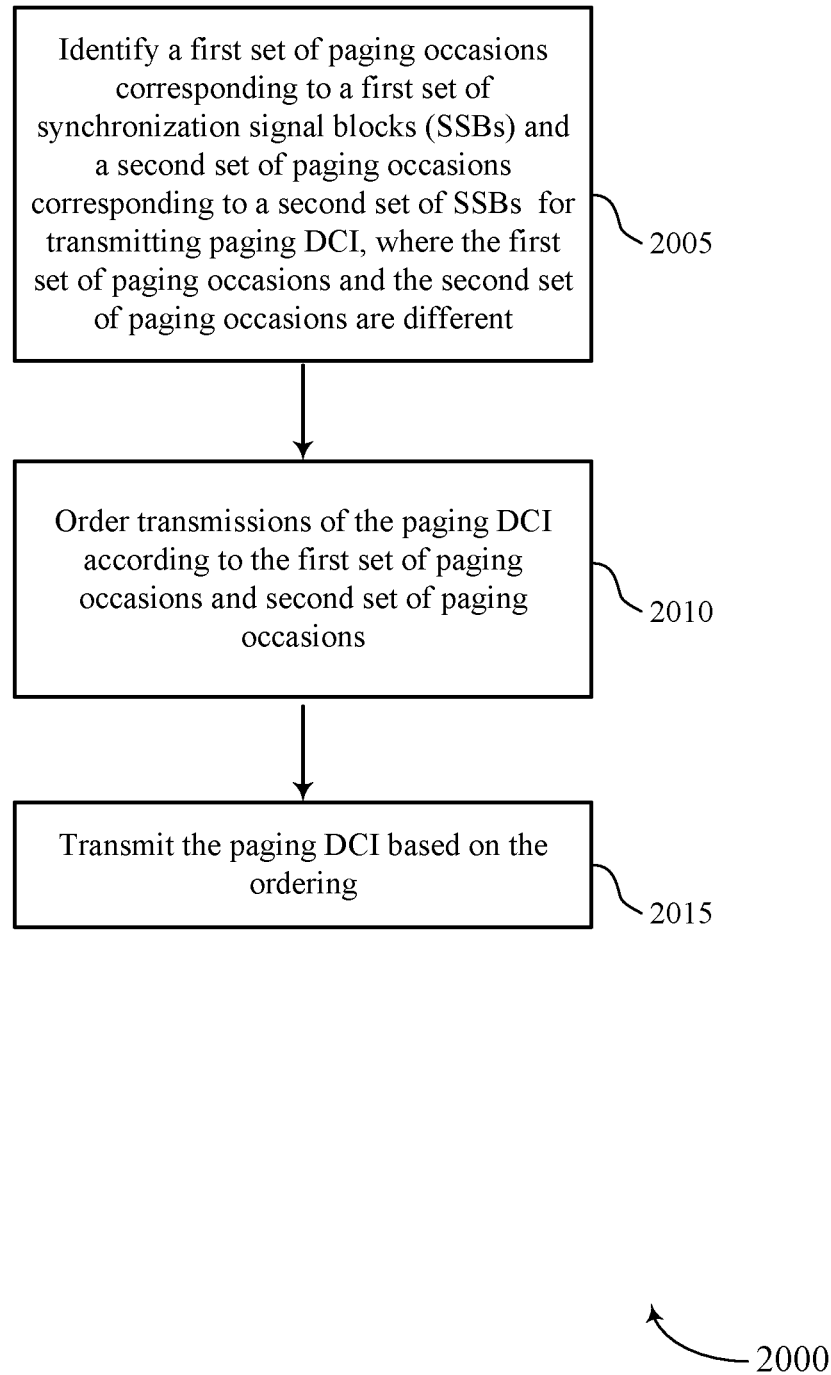

FIG. 20 shows a flowchart illustrating a method 2000 that supports paging configuration in beamformed wireless communications in accordance with aspects of the present disclosure. The operations of method 2000 may be implemented by a base station 105 or components thereof as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may identify a first set of paging occasions corresponding to a first set of synchronization signal blocks (SSBs) and a second set of paging occasions corresponding to a second set of SSBs for transmitting paging DCI, where the first set of paging occasions and the second set of paging occasions are different. The operations of 2005 may be performed according to the methods described herein. In some examples, aspects of the operations of 2005 may be performed by a paging configuration manager as described with reference to FIGS. 12 through 15. Additionally or alternatively, means for performing 2005 may, but not necessarily, include, for example, transceiver 1520, communications manager 1510, memory 1530 (including code 1535), network communications manager 1515, inter-station communications manager 1545, processor 1540 and/or bus 1550.

At 2010, the base station may order transmissions of the paging DCI according to the first set of paging occasions and second set of paging occasions. The operations of 2010 may be performed according to the methods described herein. In some examples, aspects of the operations of 2010 may be performed by a search space ordering manager as described with reference to FIGS. 12 through 15. Additionally or alternatively, means for performing 2010 may, but not necessarily, include, for example, antenna 1525, transceiver 1520, communications manager 1510, memory 1530 (including code 1535), network communications manager 1515, inter-station communications manager 1545, processor 1540 and/or bus 1550.

At 2015, the base station may transmit the paging DCI based on the ordering. The operations of 2015 may be performed according to the methods described herein. In some examples, aspects of the operations of 2015 may be performed by a paging configuration manager as described with reference to FIGS. 12 through 15. Additionally or alternatively, means for performing 2015 may, but not necessarily, include, for example, antenna 1525, transceiver 1520, communications manager 1510, memory 1530 (including code 1535), network communications manager 1515, inter-station communications manager 1545, processor 1540 and/or bus 1550.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a paging configuration from a base station, the paging configuration indicating a paging occasion during which the UE is to monitor for pages that are transmitted from the base station, wherein
      the paging occasion comprises a plurality of physical downlink control channel (PDCCH) monitoring occasions and the paging occasion is associated with a duration that is based at least in part on a number of synchronization signal blocks (SSBs) transmitted by the base station, and
      the paging configuration indicates a location of a first PDCCH monitoring occasion of the paging occasion and the paging configuration indicates an association between the PDCCH monitoring occasions of the paging occasion and the SSBs transmitted by the base station;
   monitoring for a paging transmission from the base station during the paging occasion; and
   receiving a page from the base station based at least in part on the monitoring.

2. The method of claim 1, wherein the paging configuration further indicates a starting location of the paging occasion of the base station within a paging frame.

3. The method of claim 1, wherein the association between the PDCCH monitoring occasions of the paging occasion and the SSBs comprises a one-to-one mapping between SSBs and PDCCH monitoring occasions.

4. The method of claim 1, wherein the association between the PDCCH monitoring occasions of the paging occasion and the SSBs comprises a many-to-one mapping between SSBs and PDCCH monitoring occasions.

5. The method of claim 4, wherein two or more PDCCH monitoring occasions are configured within one slot, and wherein different SSBs are mapped to each of the two or more PDCCH monitoring occasions within the one slot.

6. The method of claim 1, wherein a demodulation reference signal (DMRS) of the paging transmission is spatially quasi-co-located (QCL) with an SSB that is associated with a PDCCH monitoring occasion of the paging transmission.

7. The method of claim 6, wherein a paging search space is unavailable based at least in part on the paging search space overlapping with uplink resources or valid physical random access channel (PRACH) occasions.

8. The method of claim 1, wherein the paging configuration is received from the base station via one or more of a downlink control information (DCI) transmission, a medium access control (MAC) control element (CE) transmission, a handover message, a reference signal sequence, or any combinations thereof.

9. The method of claim 1, wherein a starting location of the first PDCCH monitoring occasion is based at least in part on an offset value associated with the paging occasion.

10. The method of claim 9, wherein the starting location of the first PDCCH monitoring occasion is based at least in part on an index value of at least one SSB of the SSBs transmitted by the base station.

11. The method of claim 9, wherein the paging configuration indicates a number of downlink slots of the paging occasion.

12. The method of claim 11, further comprising:
determining the duration of the paging occasion based at least in part on the number of downlink slots and one or more slots that are unavailable for paging transmissions between a starting slot associated with the starting location and a last slot of the number of downlink slots.

13. The method of claim 1, wherein the paging configuration is received from the base station via one or more of a remaining minimum system information (RMSI) transmission, an other system information (OSI) transmission, a radio resource configuration (RRC) transmission, or any combinations thereof.

14. The method of claim 1, wherein the duration associated with the paging occasion is further based at least in part on a subcarrier spacing (SCS) configured for beamformed transmission beams.

15. The method of claim 1, wherein the page is received from the base station via a beamformed transmission beam.

16. A method for wireless communication at a base station, comprising:
transmitting a paging configuration to a user equipment (UE), the paging configuration indicating a paging occasion during which the UE is to monitor for pages that are transmitted from the base station, wherein
the paging occasion comprises a plurality of physical downlink control channel (PDCCH) monitoring occasions and the paging occasion is associated with a duration that is based at least in part on a number of synchronization signal blocks (SSBs) transmitted by the base station, and
the paging configuration indicates a location of a first PDCCH monitoring occasion of the paging occasion and the paging configuration indicates an association between the PDCCH monitoring occasions of the paging occasion and the SSBs transmitted by the base station;
transmitting a page to the UE during the paging occasion; and
receiving a paging response from the UE responsive to the page.

17. The method of claim 16, wherein the paging configuration further indicates a starting location of the paging occasion of the base station within a paging frame.

18. The method of claim 16, wherein the association between the PDCCH monitoring occasions of the paging occasion and the SSBs comprises a one-to-one mapping between SSBs and PDCCH monitoring occasions.

19. The method of claim 16, wherein the association between the PDCCH monitoring occasions of the paging occasion and the SSBs comprises a many-to-one mapping between SSBs and PDCCH monitoring occasions.

20. The method of claim 19, wherein two or more PDCCH monitoring occasions are configured within one slot, and wherein different SSBs are mapped to each of the two or more PDCCH monitoring occasions within the one slot.

21. The method of claim 16, wherein the paging configuration is transmitted via one or more of a downlink control information (DCI) transmission, a medium access control (MAC) control element (CE) transmission, a handover message, a reference signal sequence, or any combinations thereof.

22. The method of claim 16, wherein a starting location of the first PDCCH monitoring occasion is based at least in part on an offset value associated with the paging occasion.

23. The method of claim 22, wherein the starting location of the first PDCCH monitoring occasion is based at least in part on an index value of at least one SSB of the SSBs transmitted by the base station.

24. The method of claim 22, wherein the paging configuration indicates a number of downlink slots of the paging occasion.

25. The method of claim 24, further comprising:
determining the duration of the paging occasion based at least in part on the number of downlink slots and one or more slots that are unavailable for paging transmissions between a starting slot associated with the starting location and a last slot of the number of downlink slots.

26. The method of claim 16, wherein the paging configuration is transmitted via one or more of a remaining minimum system information (RMSI) transmission, an other system information (OSI) transmission, a radio resource configuration (RRC) transmission, or any combinations thereof.

27. The method of claim 16, wherein the duration associated with the paging occasion is further based at least in part on a subcarrier spacing (SCS) configured for beamformed transmission beams.

28. An apparatus for wireless communication at a user equipment (UE), comprising:
a processor,
memory in electronic communication with the processor; and
instructions stored in the memory and executable by the processor to cause the apparatus to:
receive a paging configuration from a base station, the paging configuration indicating a paging occasion during which the UE is to monitor for pages that are transmitted from the base station, wherein
the paging occasion comprises a plurality of physical downlink control channel (PDCCH) monitoring occasions and the paging occasion is associated with a duration that is based at least in part on a number of synchronization signal blocks (SSBs) transmitted by the base station, and
the paging configuration indicates a location of a first PDCCH monitoring occasion of the paging occasion and the paging configuration indicates an association between the PDCCH monitoring occasions of the paging occasion and the SSBs transmitted by the base station;
monitor for a paging transmission from the base station during the paging occasion; and receive a page from the base station based at least in part on the monitoring.

29. An apparatus for wireless communication at a base station, comprising:
a processor;
memory in electronic communication with the processor; and
instructions stored in the memory and executable by the processor to cause the apparatus to:
transmit a paging configuration to a user equipment (UE), the paging configuration indicating a paging occasion during which the UE is to monitor for pages that are transmitted from the base station, wherein
the paging occasion comprises a plurality of physical downlink control channel (PDCCH) monitoring occasions and the paging occasion is associated with a duration that is based at least in part on a number of synchronization signal blocks (SSBs) transmitted by the base station, and
the paging configuration indicates a location of a first PDCCH monitoring occasion of the paging occasion and the paging configuration indicates an association between the PDCCH monitoring occasions of the paging occasion and the SSBs transmitted by the base station;
transmit a page to the UE during the paging occasion; and
receive a paging response from the UE responsive to the page.

30. An apparatus for wireless communication at a user equipment (UE), comprising:
means for receiving a paging configuration from a base station, the paging configuration indicating a paging occasion during which the UE is to monitor for pages that are transmitted from the base station, wherein
the paging occasion comprises a plurality of physical downlink control channel (PDCCH) monitoring occasions and the paging occasion is associated with a duration that is based at least in part on a number of synchronization signal blocks (SSBs) transmitted by the base station, and
the paging configuration indicates a location of a first PDCCH monitoring occasion of the paging occasion and the paging configuration indicates an association between the PDCCH monitoring occasions of the paging occasion and the SSBs transmitted by the base station;
means for monitoring for a paging transmission from the base station during the paging occasion; and
means for receiving a page from the base station based at least in part on the monitoring.

31. An apparatus for wireless communication at a base station, comprising:
means for transmitting a paging configuration to a user equipment (UE), the paging configuration indicating a paging occasion during which the UE is to monitor for pages that are transmitted from the base station, wherein
the paging occasion comprises a plurality of physical downlink control channel (PDCCH) monitoring occasions and the paging occasion is associated with a duration that is based at least in part on a number of synchronization signal blocks (SSBs) transmitted by the base station, and
the paging configuration indicates a location of a first PDCCH monitoring occasion of the paging occasion and the paging configuration indicates an association between the PDCCH monitoring occasions of the paging occasion and the SSBs transmitted by the base station;
means for transmitting a page to the UE during the paging occasion; and
means for receiving a paging response from the UE responsive to the page.

* * * * *